United States Patent
Kang et al.

(10) Patent No.: US 7,849,145 B2
(45) Date of Patent: Dec. 7, 2010

(54) METHOD AND SYSTEM FOR PROVIDING JOINT VIEWING SERVICE OF MOVING PICTURE

(75) Inventors: Kyung-Don Kang, Seoul (KR); Sang-Yun Oh, Gyeonggi-do (KR); Jong-Il Lee, Seoul (KR); Kang-In Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 826 days.

(21) Appl. No.: 11/572,442

(22) PCT Filed: Jul. 27, 2005

(86) PCT No.: PCT/KR2005/002443

§ 371 (c)(1), (2), (4) Date: Jan. 22, 2007

(87) PCT Pub. No.: WO2006/011754

PCT Pub. Date: Feb. 2, 2006

(65) Prior Publication Data

US 2008/0034041 A1    Feb. 7, 2008

(30) Foreign Application Priority Data

Jul. 29, 2004  (KR) .................. 10-2004-0059689

(51) Int. Cl.
G06F 15/16 (2006.01)

(52) U.S. Cl. .................. 709/206; 709/231; 709/248

(58) Field of Classification Search .............. 709/204, 709/205, 206, 217, 219, 231–234, 236, 248; 725/37, 105, 131, 139, 151

See application file for complete search history.

(56) References Cited

U.S. PATENT DOCUMENTS

| | | | |
|---|---|---|---|
| 5,808,662 A * | 9/1998 | Kinney et al. | 348/14.1 |
| 6,393,412 B1 | 5/2002 | Deep | |
| 6,715,126 B1 | 3/2004 | Chang et al. | |
| 6,823,363 B1 * | 11/2004 | Noveck et al. | 709/204 |
| 6,985,966 B1 * | 1/2006 | Gupta et al. | 709/248 |
| 7,096,271 B1 * | 8/2006 | Omoigui et al. | 709/231 |
| 7,124,164 B1 * | 10/2006 | Chemtob | 709/204 |
| 7,143,428 B1 * | 11/2006 | Bruck et al. | 725/37 |

(Continued)

FOREIGN PATENT DOCUMENTS

JP     2001-298431 A    10/2001

(Continued)

*Primary Examiner*—Larry Donaghue
(74) *Attorney, Agent, or Firm*—H.C. Park & Associates, PLC

(57) ABSTRACT

Disclose is a method and system enabling joint viewing of moving picture while chatting. In order to match the screen being played and chatting message, a method for synchronizing contents playing times for the contents being played is further disclosed. A room master client among user clients joined the joint viewing room receives buffering state information from all clients in joint viewing and transmits playback start message to the clients in joint viewing according to the buffering state information. After contents playback is started, the room master client provides information on current contents playing time to the other user clients periodically, and the other clients synchronize contents playing times based on the current contents playing time of the room master client.

32 Claims, 21 Drawing Sheets

U.S. PATENT DOCUMENTS

| | | | |
|---|---|---|---|
| 7,188,193 B1 * | 3/2007 | Getsin et al. | 709/248 |
| 7,493,647 B2 * | 2/2009 | White et al. | 725/87 |
| 2002/0112244 A1 * | 8/2002 | Liou et al. | 725/93 |
| 2002/0120939 A1 * | 8/2002 | Wall et al. | 725/87 |
| 2004/0103444 A1 * | 5/2004 | Weinberg et al. | 725/132 |
| 2005/0262542 A1 * | 11/2005 | DeWeese et al. | 725/106 |
| 2006/0002681 A1 * | 1/2006 | Spilo et al. | 386/46 |

FOREIGN PATENT DOCUMENTS

| | | |
|---|---|---|
| JP | 2002-77857 A | 3/2002 |
| JP | 2004-145541 A | 5/2004 |
| KR | 2002-82623 A | 10/2002 |
| KR | 1020020082623 | 10/2002 |

\* cited by examiner

METHOD AND SYSTEM FOR PROVIDING JOINT VIEWING SERVICE OF MOVING PICTURE

CROSS REFERENCE TO RELATED APPLICATIONS

This application is a U.S. National Phase Application of International Application PCT Application No. PCT/KR2005/002443 filed on Jul. 27, 2005, which claims the benefit of priority from Korean Patent Application No. 10-2004-0059689 filed on Jul. 29, 2004. The disclosures of International Application PCT Application No. PCT/KR2005/002443 and Korean Patent Application No. 10-2004-0059689 are incorporated herein by reference.

FIELD OF THE INVENTION

The present invention relates to a method and system for providing joint viewing service of moving picture, more particularly to method and system for providing moving picture streaming data such as movie, animation, etc, to a plurality of users.

BACKGROUND OF THE INVENTION

Conventionally, moving picture contents such as movie, animation was provided from media such as TV or video.

As contents delivery service through Internet develops, providing the moving picture contents such as movie, animation in the form of VOD (Video On Demand) is increasing. Recently, Real time transmission of public broadcasting as well as VOD service is being provided.

Internet VOD service is advantageous in that users can enjoy contents at desired time compared with video or public broadcasting. However, on account of transmission rate limit of Internet, high quality contents such as public broadcasting or video cannot be provided. Further, as most of users watch VOD contents alone in one's room, enjoyment by watching contents with others cannot be obtained, and therefore, VOD service is not yet popular as video or public broadcasting.

In order to solve above-described problems of the VOD service, the research for contents delivery technology is being performed continuously, research for providing VOD service in various ways is also being performed besides the traditional way that contents data is simply provided to users by users' request.

The present invention intends to solve the problem that enjoyment by watching contents with others cannot be obtained among problems of VOD service. The present invention relates to method for providing moving picture contents where users can exchange chatting messages regarding their opinion, by which effect that users get enjoyment like watching moving picture contents with other people.

DETAILED DESCRIPTION OF THE INVENTION

Technical Objects

In order to solve above-mentioned problems of the prior art, an aspect of the present invention is to provide a method and system for providing joint viewing service of moving picture by which users that joined a chatting room or an online theater can exchange their opinions through chatting message while watching moving picture contents.

Another aspect of the present invention is to provide a method and system for providing joint viewing service of moving picture by which contents playing times of users in joint viewing can be synchronized.

Technical Solution

According to a preferred embodiment of the present invention, there is provided a service method for providing joint viewing of contents comprising the steps of: creating a room in response to request for creating joint viewing room from a user (a); receiving request for joining the joint viewing room from at least one other user (b); providing contents data to the users that joined the joint viewing room and providing buffering state information of users in the joint viewing room to a room master client to transmit contents playback start message received from the room master client to other clients in the joint viewing room (c); controlling transmission/receipt of chatting messages transmitted from users in the joint viewing room while contents being played (d), wherein, a contents player for playing the contents and providing chatting related interface is installed in the user clients in the joint viewing room, and the room master client transmits current contents playing time information to the other user clients in the joint viewing room periodically, and the other user clients besides the room master client synchronizes the contents playing time based on the contents playing time of the room master client.

MODE OF INVENTION

Hereinafter, the preferred embodiment of the present invention will be described with accompanying drawings.

The First Embodiment

Figure 1:
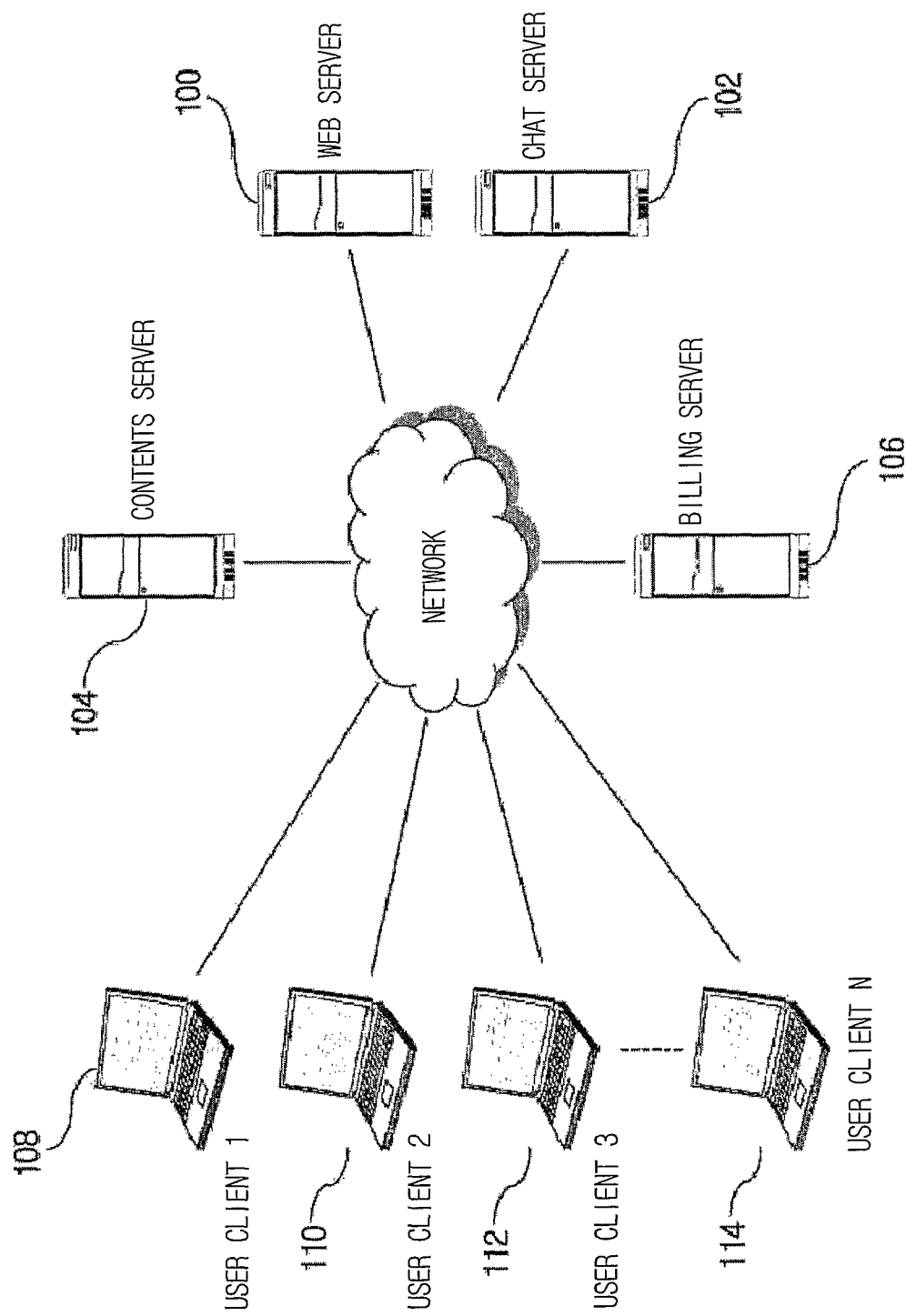
FIG. 1 illustrates configuration of system for joint viewing of moving picture according to a preferred embodiment of the present invention.

FIG. 1 illustrates configuration of system for joint viewing of moving picture according to a preferred embodiment of the present invention.

Referring to FIG. 1, system for joint viewing of moving picture according to an embodiment of the present invention may comprise a web sever 100, a chat server 102, a contents server 104, a billing server 106 and a plurality of user clients 108, 110, 112, 114.

In FIG. 1, the web server 100 receives request for joint viewing of moving picture from user clients 108, 110, 112, 114. The web server 100 provides web page by which users can request joint viewing of moving picture, and users can request joint viewing of moving picture by clicking menu of the web page using interface such as mouse.

According to an embodiment of the present invention, the service for joint viewing of moving picture is provided so that users can watch moving pictures by chatting with other users after chatting room is opened.

According to another embodiment of the present invention, the service can be provided so that plurality of users can watch moving pictures in a particular time like off-line theater. At this case, time table for showing moving picture is provided, and users can request joint viewing of moving picture at desired time through web page, and service for joint viewing of moving pictures is provided at predetermined time. At this case, it is preferred that chatting service is provided together so that users can realize that they are joint viewing moving pictures. Further, the service can be provided with cheaper price compared with general VOD (Video On Demand) service because service is provided to plurality of users simultaneously at appointed time.

According to another embodiment of the present invention, joint viewing service of moving picture can be provided in the form of joint buying. For example, if there are users more than predetermined number of users that request service for joint viewing of moving pictures, the service is provided with cheaper price than general VOD service.

The moving pictures may include movies, animations, dramas, etc. Although VOD service is mentioned in above embodiments, the present invention can also be applied to real time broadcasting service.

According to the present invention, users can chat with other users who are watching the moving picture together, by which user can be provided with more exciting service.

The chat server 102 relays chatting messages of users in joint viewing of movies and manages users. The messages transmitted by users while watching moving pictures are transmitted to other users that are watching moving picture together through the chat server 102. According to another embodiment of the present invention, the chat server 102 just connects session of users that are watching moving pictures together and the chatting message can be transmitted by P2P (Peer to Peer) method.

Further, the chat server 102 controls contents playing time of moving pictures. In order to realize joint viewing substantially, the users that joined joint viewing should see same screen at the same time. If the contents playing times of moving pictures are not same, chatting message about the moving picture between users may not be consistent and some users can know plot of moving pictures previously. Therefore, chat server 102 checks contents playing time of users in joint viewing and occurrence of buffering continuously, and synchronizes contents playing times of users in joint viewing. The method that chat server synchronizes contents playing time is described in more detail referring to another figure.

A contents player including chatting module for sending chatting message between users in joint viewing is installed in the user clients 108, 110, 112, 114. The contents player that are installed in the user clients 108, 110, 112, 114 may include a window for displaying chatting message and a window for inputting chatting message. Further, the installed contents player transmits contents playing time of moving pictures to the chat server 102 for synchronization of contents playing time and transmits information on occurrence of buffering when buffering on account of slow download rate occurs.

Moving picture contents is stored in the contents server 104 and the contents server transmits corresponding contents according to the request of user clients. When a user requests joint viewing using web page provided by the web server 100, the web server 100 provides address information of contents server that stores the requested moving picture, and the contents player of the user client requests contents data to the contents server corresponding to the received address information and downloads the contents data.

According to another embodiment of the present invention, the web server or a database connected to the web server may store the contents.

Although one contents server is shown in FIG. 1, there may be plurality of contents servers and users can receive contents data by parallel/distribution method. Further, contents server need not be a server of service provider, the contents can be other user client that store the corresponding contents, and the client which requests contents download contents by P2P (Peer to Peer) method from other user clients.

The billing server 106 performs billing for moving picture contents. The billing server 106 may interact with web server 100. If a user requests billing through the web server 100, the billing server 106 performs billing.

Figure 2:
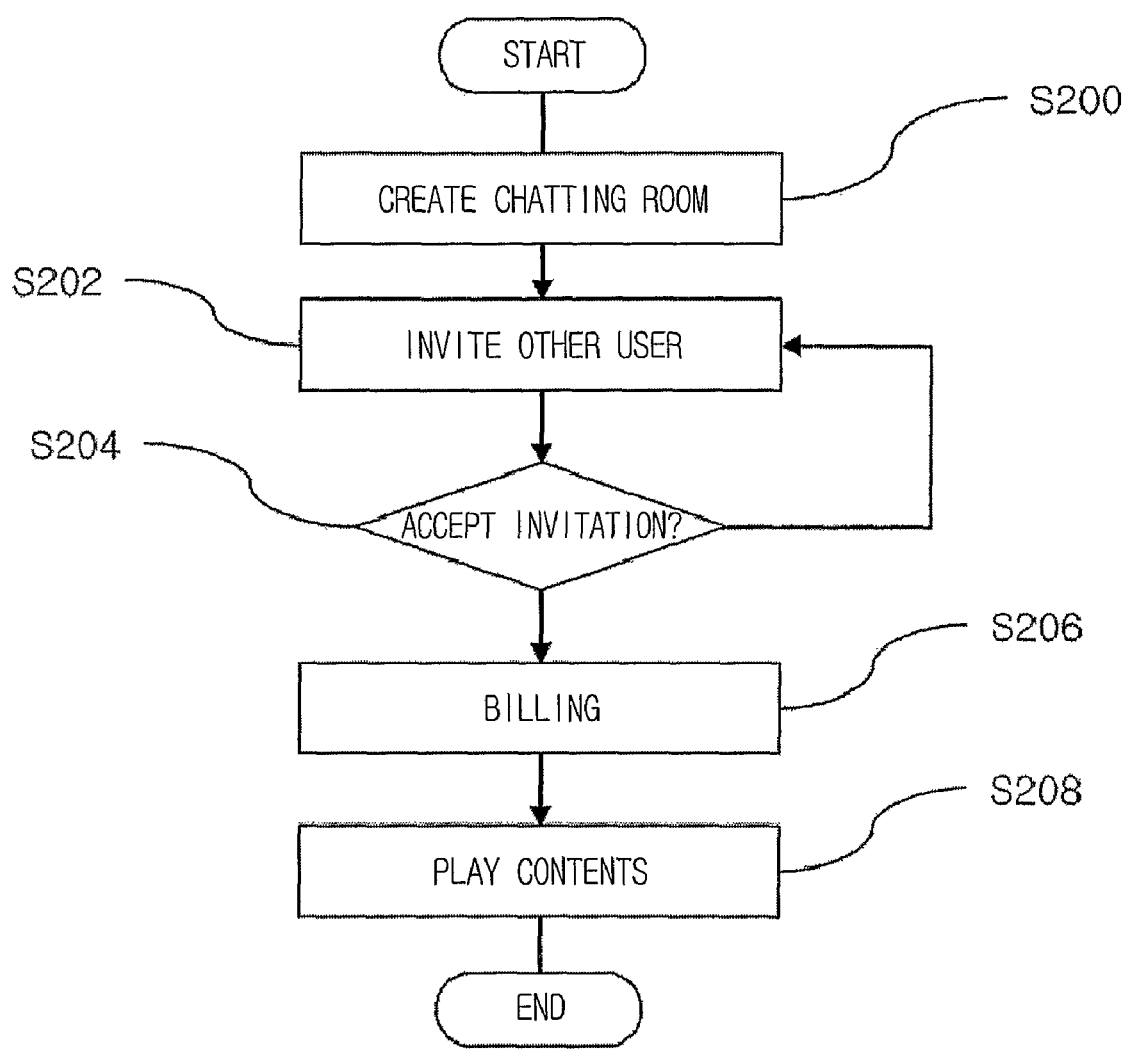
FIG. 2 illustrates a flow chart of method for providing joint viewing service according to an embodiment of the present invention.

FIG. 2 illustrates a flow chart of method for providing joint viewing service according to an embodiment of the present invention.

Referring to FIG. 2, firstly, user creates chatting room S200. The chatting room may be for only joint viewing. Alternatively, a menu for requesting joint viewing of moving picture can be provided in general chatting room.

The user that created chatting room invites other users that will join joint viewing S202. It would be obvious to those skilled in the art that other users can join the chatting room using chatting room title list, etc. without being invited.

If other user joins the chatting room in response to the invitation message S204, moving picture contents is selected S206.

If moving picture contents is selected, billing for selected contents is processed S206. Although case that contents selection and billing is performed after creation of chatting room is described in FIG. 2, contents selection and billing can be also be performed while creating chatting room.

If contents selection and billing is completed, users in the chatting room watches contents together S208. Users can exchange chatting message while watching contents. Further, the chat server checks contents playing time of users in the same chatting room continuously for synchronization of contents playing time.

Although it is not shown in FIG. 2, playing of contents is started when predetermined size of data is buffered in the user clients that joined joint viewing. Further, download rate can be checked when a user joins chatting room, and it would be preferable to allow only the users which meet the predetermined rate. When contents download rate is low on account of network condition and hardware spec etc., it would affect joint viewing of other users.

Figure 12:
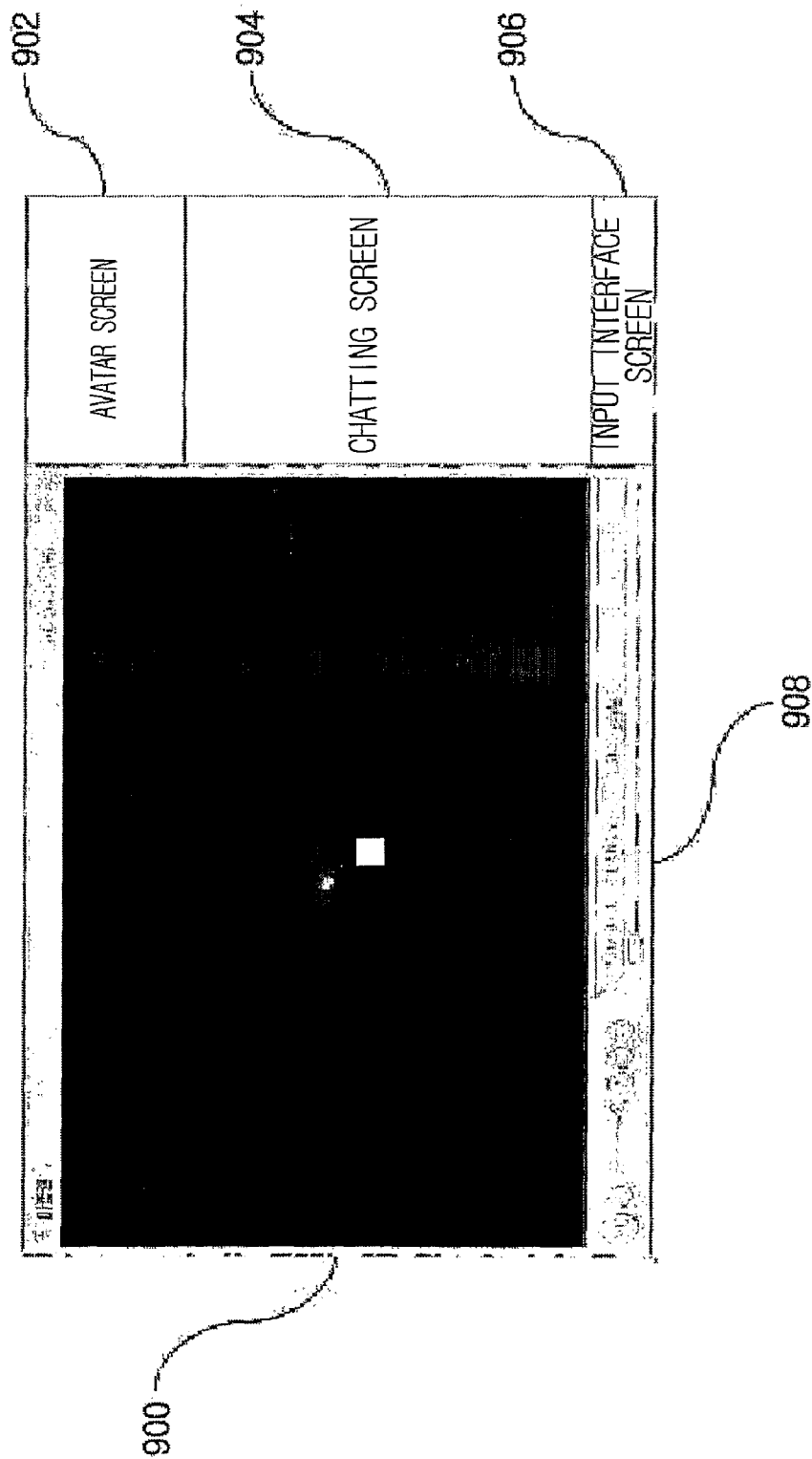
FIG. 12 is a screen of contents player which provides joint viewing function according to a preferred embodiment of the present invention.

FIG. 12 is a screen of contents player which provides joint viewing function according to a preferred embodiment of the present invention.

Referring to FIG. 12, the screen of contents player may include a contents playing screen 900, an avatar screen 902, chatting message screen 904, message input screen 906 and input interface screen 908.

Unlike general contents players, the moving picture contents player further includes the avatar screen 902, chatting message screen 904 and message input screen 906.

The user that watches moving picture can input chatting message to be transmitted to other users in the chatting message screen, and the transmitted message is displayed in chatting message screen 904.

FIG. 12 is just an example of contents player screen, it would be obvious to those skilled in the art that the location of each screen can be varied and additional screen can be provided.

Figure 3:
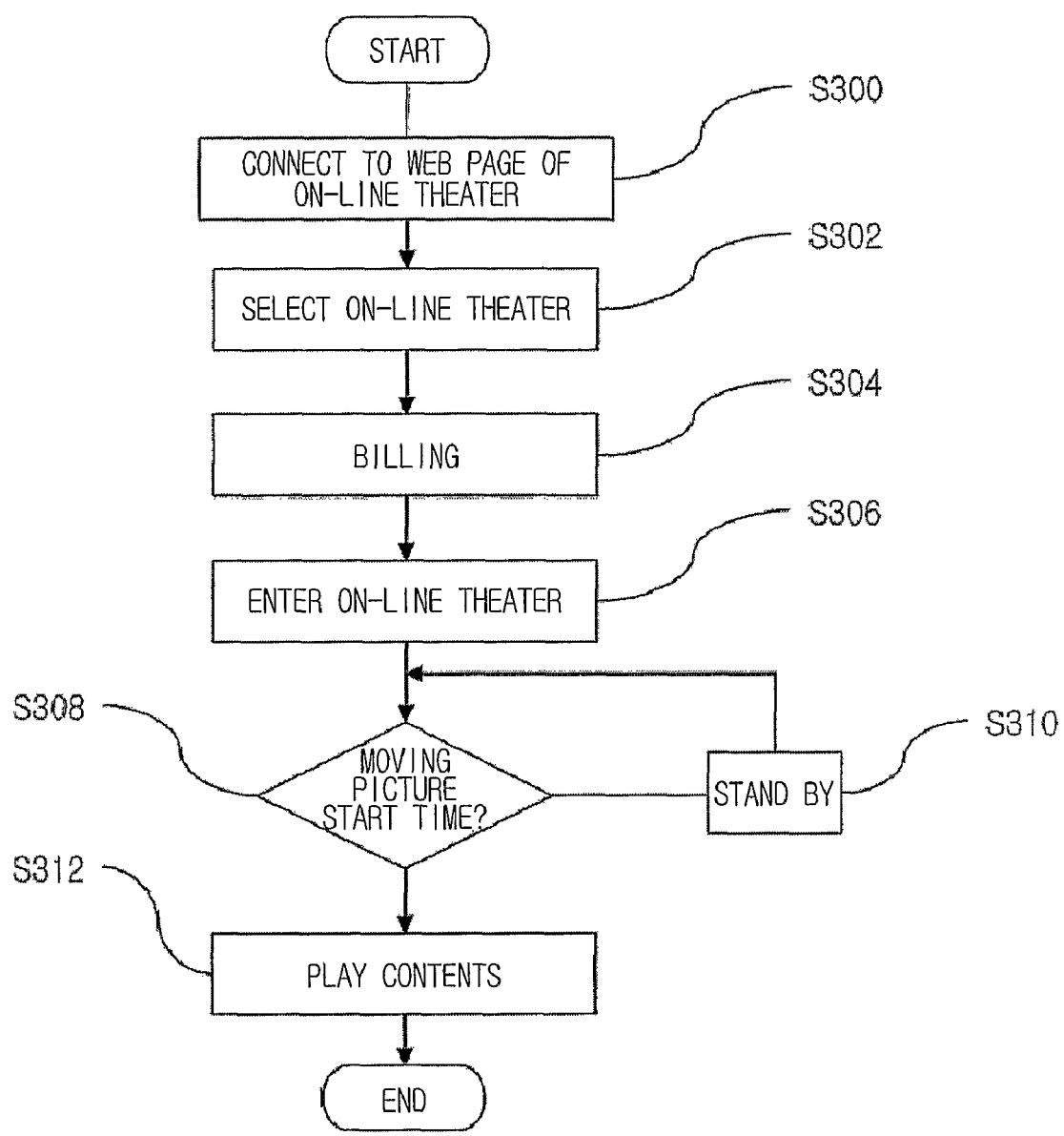
FIG. 3 illustrates a flow chart of method for providing service for joint viewing of moving picture according to another embodiment of the present invention.

FIG. 3 illustrates a flow chart of method for providing service for joint viewing of moving picture according to another embodiment of the present invention.

FIG. 3 illustrates service where off-line theater concept is applied. Referring to FIG. 3, firstly, user connects to web page which provides on-line theater service S300.

The on-line theater web page displays moving picture contents information and information on the time when the moving picture is played for each of on-line theater, the user selects on-line theater using the displayed information S302. If the user selects the on-line theater, billing is performed 304.

When billing is completed, the user connects to the web page corresponding to the selected on-line theater S306. It is preferable that the on-line theater provides chatting service for users that entered on-line theater before playing moving picture contents. Until the moving picture playing time, users that entered the on-line theater is in standby state S310. On moving picture playing time, the contents player of users that entered the on-line theater starts playing at the same time S312.

Figure 13:
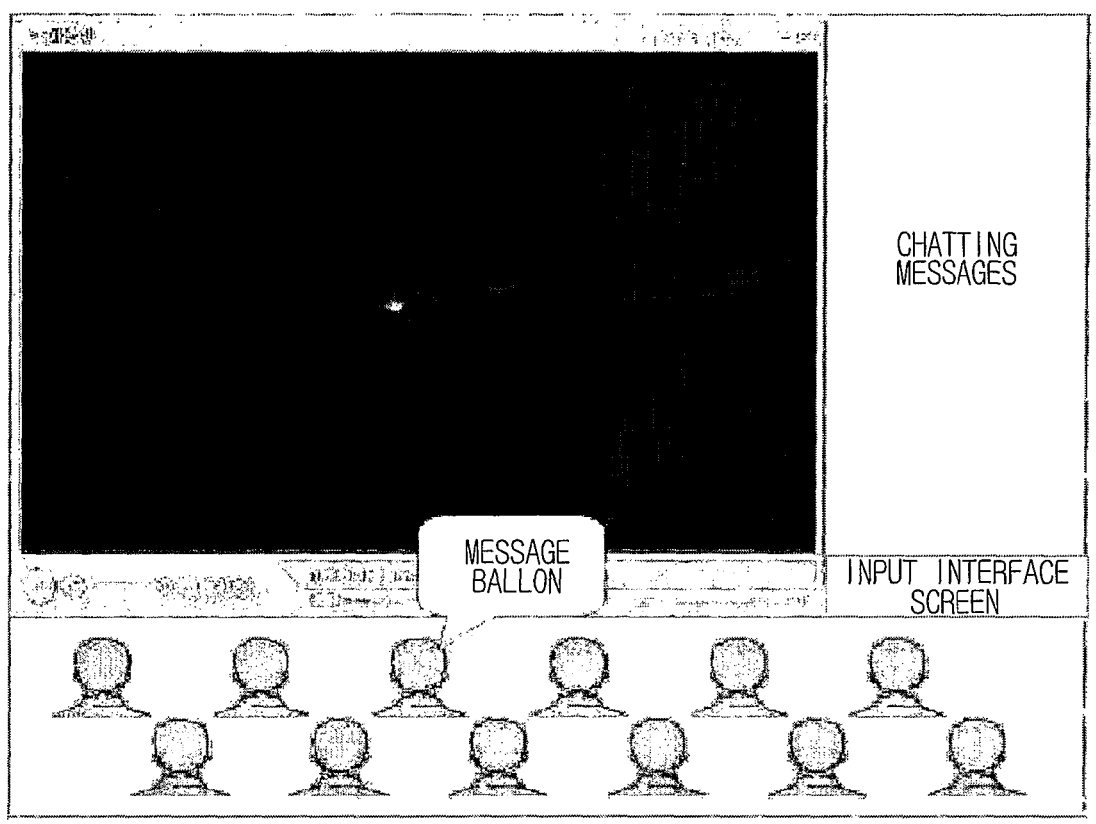
FIG. 13 is a screen of contents player which provides joint viewing function according to another embodiment of the present invention.

FIG. 13 is a screen of contents player which provides joint viewing function according to another embodiment of the present invention.

When on-line theater concept is applied, contents player of FIG. 13 with different screen from FIG. 12 can be used.

Referring to FIG. 13, in lower part of the contents player, avatars of users that joined joint viewing can be displayed and message between users can be provided in the form of balloon.

Further, users can control the expression and action of avatars. By controlling expression and action of avatars in interesting or sad scene, sense of reality can be promoted.

Figure 4:
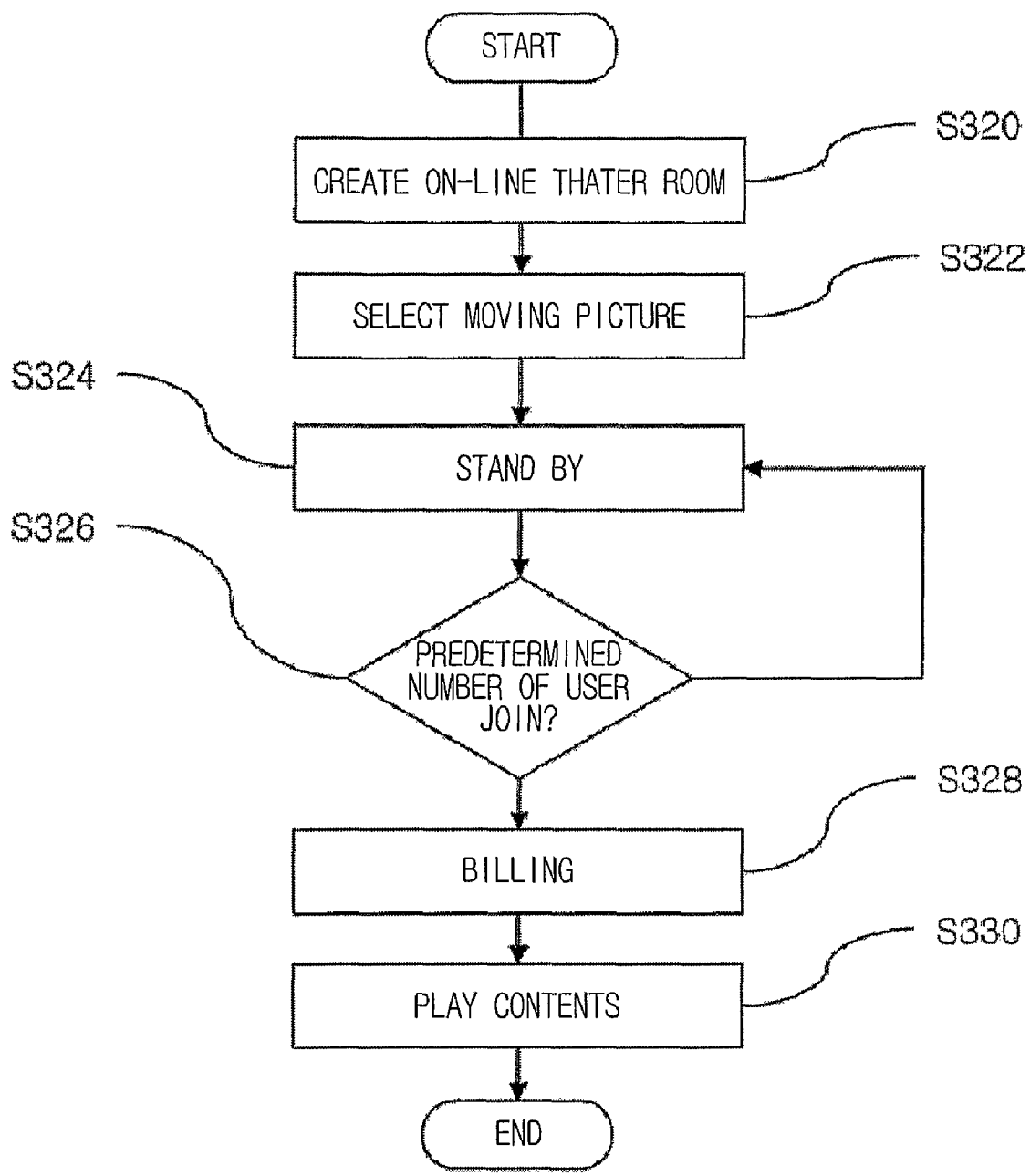
FIG. 4 illustrates a flow chart of method for providing moving picture joint viewing service according to another embodiment of the present invention.

FIG. 4 illustrates a flow chart of method for providing moving picture joint viewing service according to another embodiment of the present invention.

FIG. 4 illustrates a joint viewing service where joint buying concept is applied, which starts joint viewing when predetermined number of users joins joint viewing.

Referring to FIG. 4, the user creates on-line theater room S320, and selects moving picture contents S322. Selection of moving picture can also be performed while creating on-line theater room.

It is determined if predetermined number of users join the on-line theater room S326. If predetermined number of users do not join the on-line theater room, the users that joined the on-line theater room are in standby state S324.

If predetermined number of users join the online theater room, billing is performed S328.

If billing is completed, contents players of users that joined the on-line theater room starts playing of moving picture at the same time S330.

In case of FIG. 3 and FIG. 4, contents playback is started when predetermined size of contents data is buffered in user clients. Further, if contents download speed is lower than predetermined critical value for some users, the joint viewing cannot be allowed for corresponding users.

Figure 5:
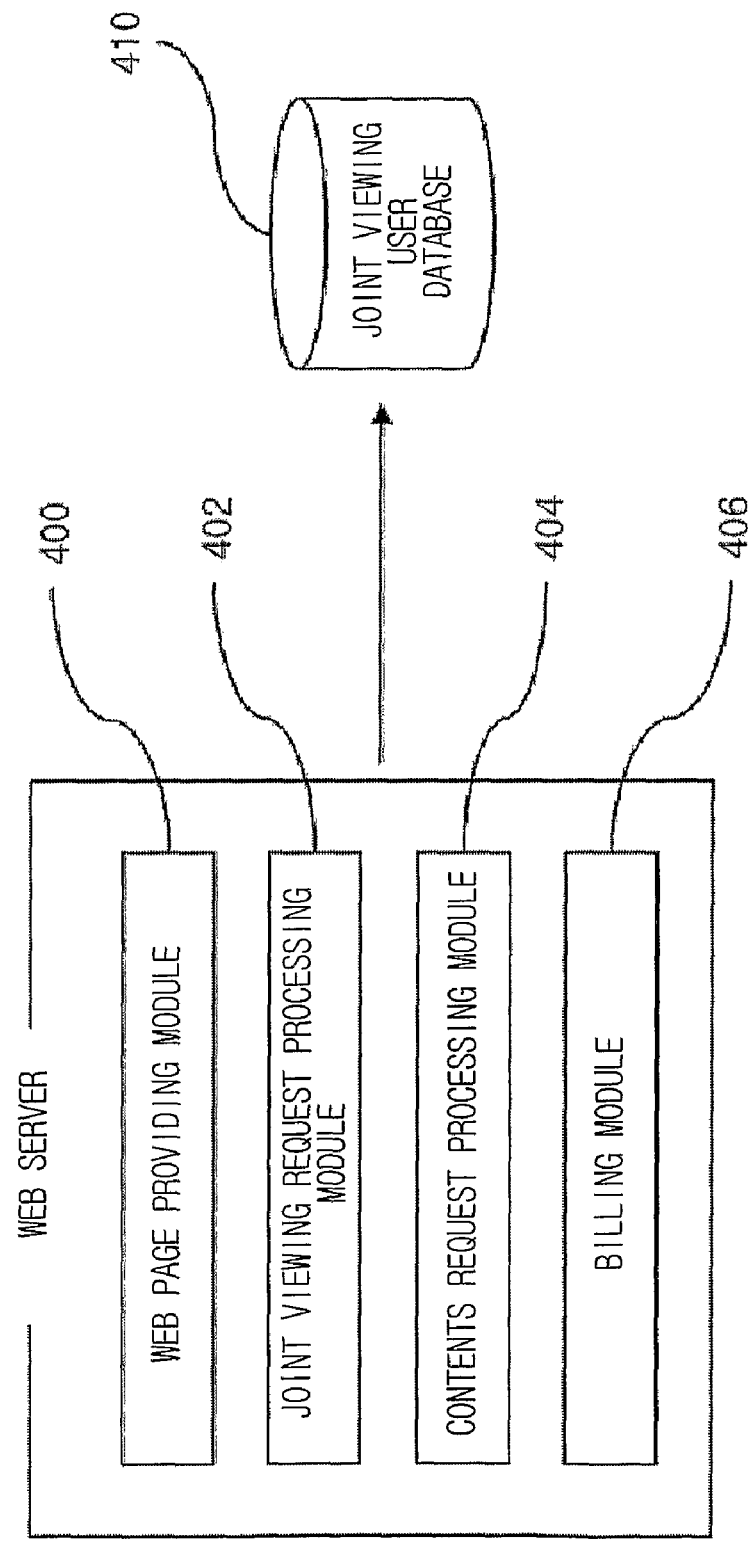
FIG. 5 illustrates a module configuration of the web server according to the first embodiment of the present invention.

FIG. 5 illustrates a module configuration of the web server according to the first embodiment of the present invention.

Referring to FIG. 5, the web server according to the first embodiment of the present invention may comprise a web page providing module 400, a joint viewing request processing module 402, a contents request processing module 404 and a billing module 406, and the web server may be coupled to a joint viewing user database 410.

In FIG. 5, the web page providing module 400 provides web page for providing information on joint viewing. Users can request joint viewing using the web page.

The joint viewing request processing module 402 processes request for joint viewing. When a user requests for joining chatting room for joint viewing, the joint viewing request processing module 402 provides information on chatting room using the stored information on the joint viewing user database.

The contents request processing module 404 provides address of contents server that stores the requested contents and identification number of the requested contents to the client that requested contents. The clients that received information downloads contents data by connecting the corresponding contents server.

As described above, the web server itself can provide the contents without separate contents server.

The billing module 406 performs billing for contents through communication with billing server.

Information on user in joint viewing and information on user that are in standby state for joint viewing is stored in the joint viewing user database 410. Users can receive information on chatting room or on-line theater from the database directly or through the web server.

Figure 6:
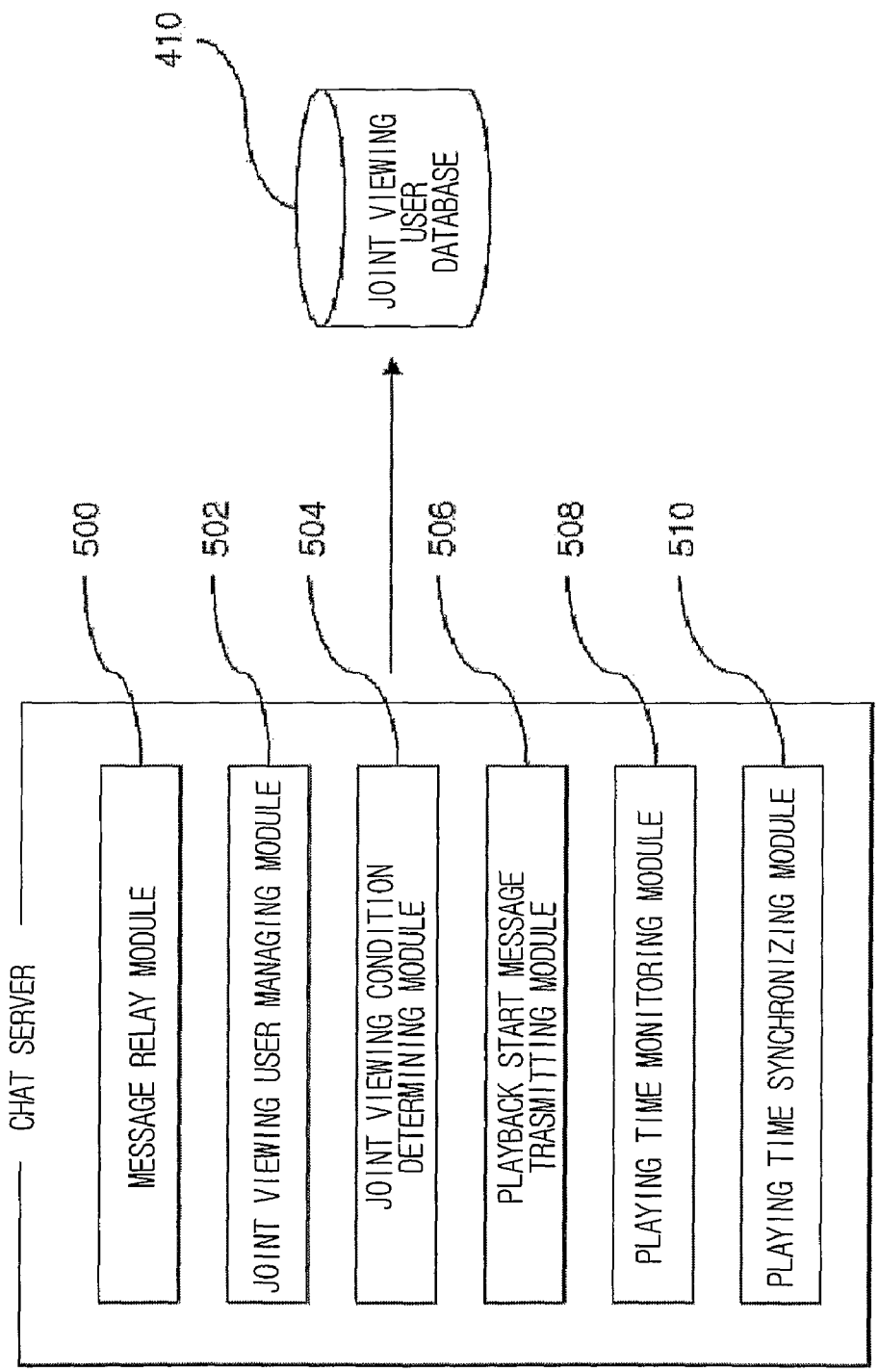
FIG. 6 illustrates a module configuration of the chat server according to the first embodiment of the present invention.

FIG. 6 illustrates a module configuration of the chat server according to the first embodiment of the present invention.

Referring to FIG. 6, the chat server according to the first embodiment of the present invention may comprise a message relay module 500, a joint viewing user managing module 502, a joint viewing condition determining module 504, a playback start message sending module 506, playing time monitoring module 508 and playing time synchronizing module 510. The chat server can also be coupled to the joint viewing user database 410.

In FIG. 6, the message relay module 500 relays messages to other users that are watching moving picture or in standby state before joint viewing. The message relay module 500 may relay the chatting message in the same manner as general chatting service. As described above, the chatting message may be transmitted by P2P method, at this case, the message relay module may not be included.

The joint viewing user managing module 502 manages information on users that joined the joint viewing. The joint viewing user managing module 502 receives joint viewing request information from user client or web server reflects the received information into joint viewing user database. Further, joint viewing user managing module updates joint viewing user database when joint viewing of a specific user is finished.

The joint viewing condition determining module 504 determines if start of joint viewing is possible. When joint viewing service is provided through chatting room, the joint viewing condition determining module 504 determines if clients of users that joined the chatting room has buffered the contents data more than predetermined size.

When joint viewing service where off-line theater concept is applied is provided, the joint viewing condition determining module determines if it is predetermined playing time and clients of users that joined the on-line theater has buffered data more than predetermined size.

When joint viewing service where joint buying concept is applied is provided, the joint viewing condition module determines if more than predetermined number of users joined the on-line theater room and clients of users that joined the on-line theater room has buffered data more than predetermined size.

The playback start message sending module 506 sends playback start messages to clients of users that joined chatting room or on-line theater simultaneously if joint viewing condition determining module determines that it is state that joint viewing is possible. The moving picture contents player installed in the client starts playback of contents in response to the playback start message, by which the plurality of user clients can start playback of contents at the same time.

The playing time monitoring module 508 receives information on playing time of contents at predetermined time interval from contents player in the user clients. Although all clients starts playback of contents at the same time by the playback start message sending module, the contents playing time of each client can be different because network condition and data processing speed is different. Therefore, the playing time monitoring module 508 checks contents playing time of user clients continuously and if contents playing time of particular client is different in more than predetermined critical value, the playing time monitoring module requests synchronization of contents playing time to the playing time synchronizing module 510.

The playing time synchronizing module 510 synchronizes contents playing time if contents playing time of particular user client is different from normal playing time or buffering occurrence information is received from particular user client.

According to an embodiment of the present invention, if contents playing time of particular client is delayed, the playing time synchronizing module 510 controls other clients to pause playing temporarily to synchronize contents playing times of all clients. More detailed explanation for synchronizing will be described referring to another figure.

Figure 7:
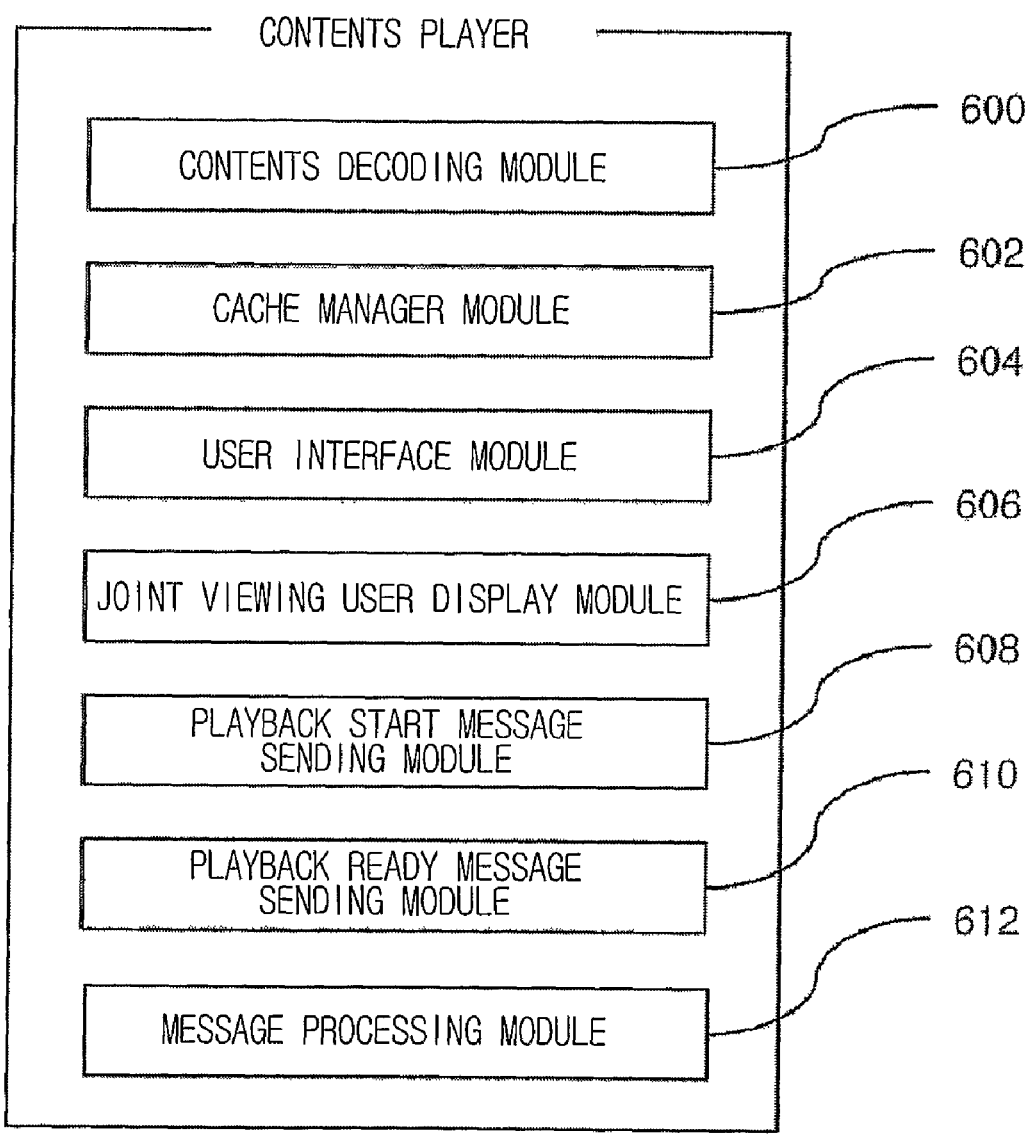
FIG. 7 illustrates a module configuration of contents player according to the first embodiment of the present invention.

FIG. 7 illustrates a module configuration of contents player according to the first embodiment of the present invention.

Referring to FIG. 7, the contents player according to the first embodiment of the present invention may comprise a contents decoding module 600, a cache control module 602, a user interface module 604, joint viewing user display module 606, playback ready message sending module 608, playing time sending module 610 and message processing module 612.

The contents decoding module 600 decodes contents data transmitted from the contents server. Information on contents encoding is included in the meta information of moving picture contents data, the contents decoding module 600 decodes contents data using decoding method corresponding to encoding method.

The cache control module 602 controls storage of contents data. Contents data is previously stored in the cache and decoded, the cache control module 602 controls storage of received contents data.

The user interface module 604 recognizes user's request when users click button provided from the contents player. For example, the contents player provides button for screen size control, volume control, etc., and the user interface module 604 recognizes user's request to perform corresponding process.

The joint viewing user display module 606 receives information from the joint viewing user database to display information users that are joining chatting room or on-line theater.

The playback ready message sending module 608 sends playback ready message to the chat server when predetermined size of data is buffered before contents playback. The above-mentioned playback start message sending module of the chat server sends playback start message when the chat server receives the playback ready message from all user clients that joined the joint viewing.

The playing time sending module 610 contents playing time to the chat server at predetermined time interval. Further, the playing time sending module 610 buffering occurrence information when buffering occurs regardless of predetermined time interval.

The message processing module 612 transmits message inputted in message input screen by joint viewing user to other joint viewing users, and receives message that other joint viewing users transmitted to display the message. As described above, the message is relayed through the chat server or the message is transmitted/received through P2P method.

Figure 8:
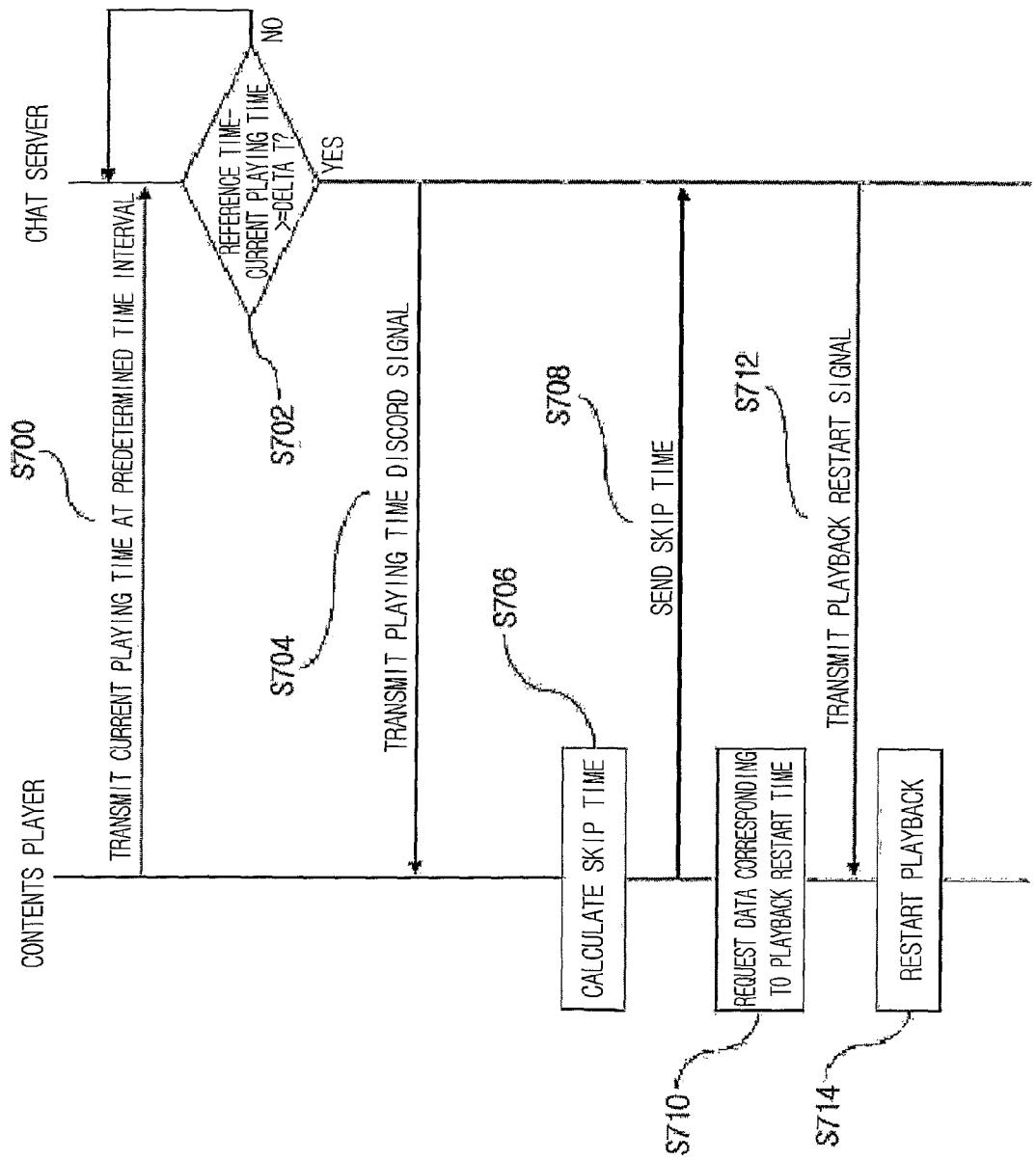
FIG. 8 illustrates a flow chart for synchronizing contents playing times when contents playing times of user clients are not same according to the first embodiment of the present invention.
Figure 9:
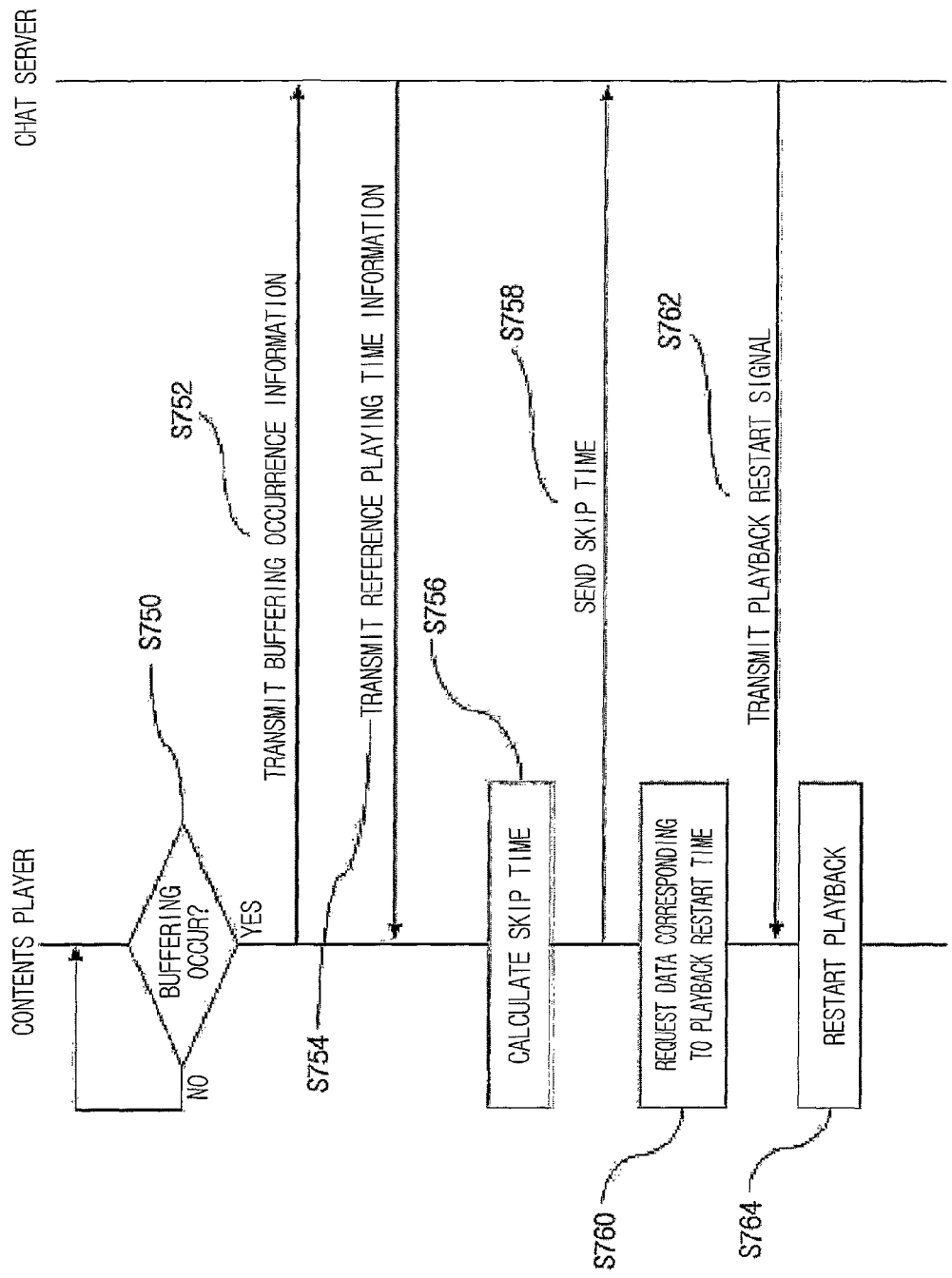
FIG. 9 is a flow chart synchronizing contents playing times when buffering occurs according to the first embodiment of the present invention.

FIG. 8 illustrates a flow chart for synchronizing contents playing times when contents playing times of user clients are not same according to the first embodiment of the present invention, FIG. 9 is a flow chart synchronizing contents playing times when buffering occurs according to the first embodiment of the present invention.

FIG. 8 and FIG. 9 illustrates method for synchronizing contents playing times by skipping a part of moving picture when contents playing time is delayed or buffering occurs.

Referring to FIG. 8, the contents playing time sending module of the contents player sends current contents playing time to chat server at predetermined time interval S700.

The chat server receives contents playing time information and determines if the difference between the received contents playing time and the reference time is greater than predetermined critical value S702. If the difference between the received contents playing time and the reference time is greater than predetermined critical value, the chat server sends contents playing time discord signal to the corresponding client S704. Current reference time information is included in the contents playing time discord signal.

When the contents playing time discord signal is received from the chat server, the contents player calculates moving picture skip time S705. The contents player may calculate skip time by considering the reference time and current data download speed.

When calculating skip time, data size table according to the difference between contents playing time and reference time may be used, or a skip time calculation algorithm of which the variable is data download speed and difference between the contents playing time and the reference time may be used. It would be obvious to those skilled in the art that the skip time may be calculated in various ways using data download speed and the delayed playing time difference compared with reference time.

In FIG. 8, the case that skip time is calculated in contents player, however, it would also be obvious to those skilled in the art that skip time may be calculated by chat server or other servers.

The calculated skip time information is transmitted to the chat server S708, the contents player requests data corresponding to playing restart time (reference time+calculated skip time) and performs buffering of the received data S710.

After skip time passes from the time that skip time information is transmitted to the chat server, the chat server sends playing restart signal to the contents player S712, the contents player that received the playing restart signal restarts contents playing S714.

In FIG. 8, the case that chat server sends playing start signal. However, the playing may be restarted automatically using timer included in the user client without receiving playing restart signal from the chat server after calculating skip time.

Referring to FIG. 9, the contents player determines if buffering occurs S750, if buffering occurs, the contents player sends buffering occurrence information to the chat server S752. As described above, the contents player detects buffering occurrence without regard to time interval where contents playing time information is transmitted.

The chat server that received buffering occurrence information sends information on current reference time to the contents player S754.

The contents player calculates skip time using reference time information and current data download speed information S756. The skip time may be calculated in above described ways. Further, as described above, the skip time may also be calculated by chat server or other servers.

The contents player transmits calculated skip time to the chat server S758, and requests contents data corresponding to the playback restart time (reference time+calculated skip time) to the contents server to perform buffering S760.

After skip time passes from the time that skip time information is transmitted to the chat server, the chat server sends playback restart signal to the contents player S762, the contents player that received the playing start signal restarts contents playing S764. Playback restart can also be performed using timer of user client without receiving playing start signal from the chat server in the case of synchronization on account of buffering occurrence.

Figure 10:
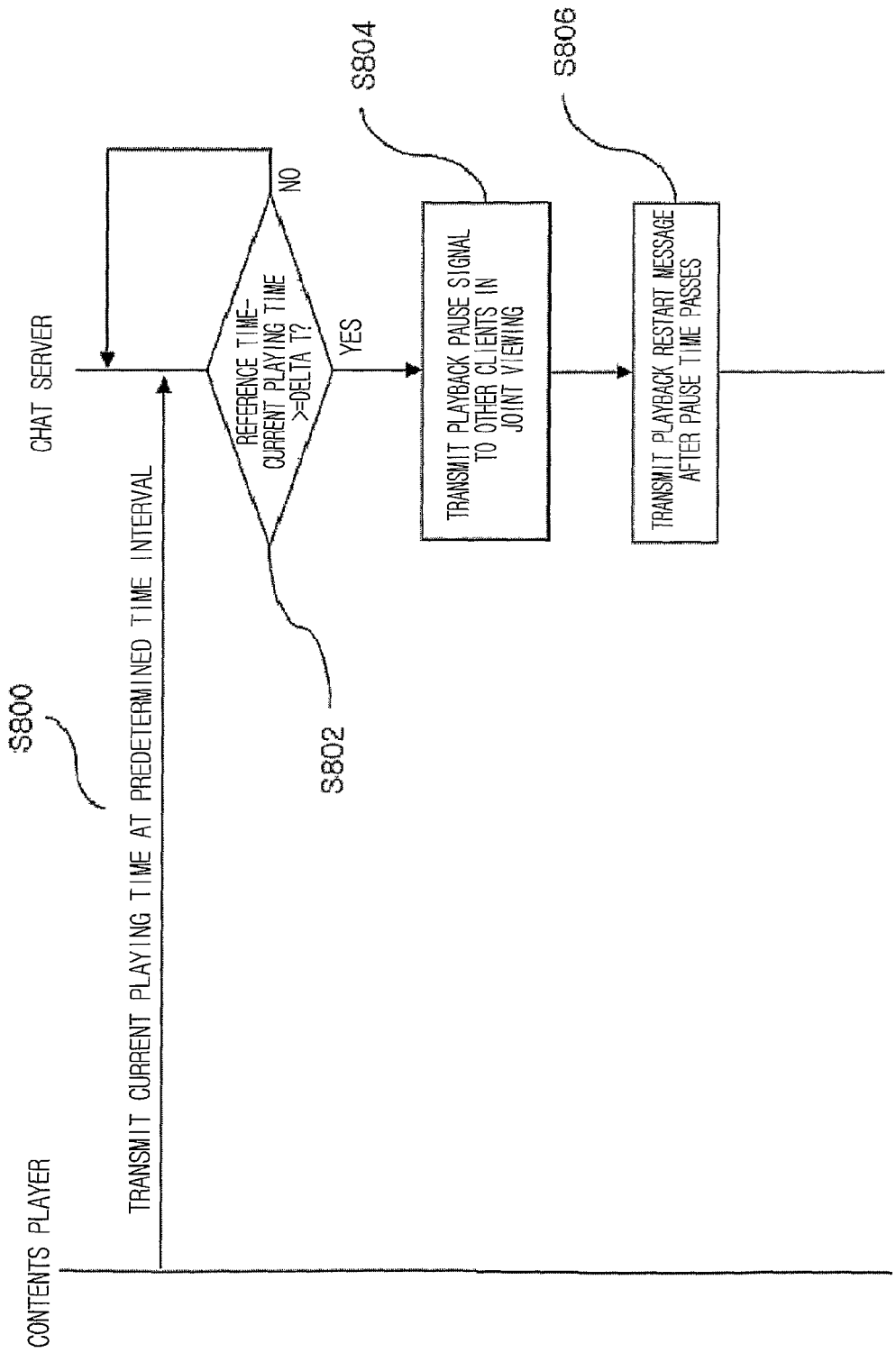
FIG. 10 is another flow chart for synchronizing contents playing times when contents playing times of user clients are not same according to the first embodiment of the present invention
Figure 11:
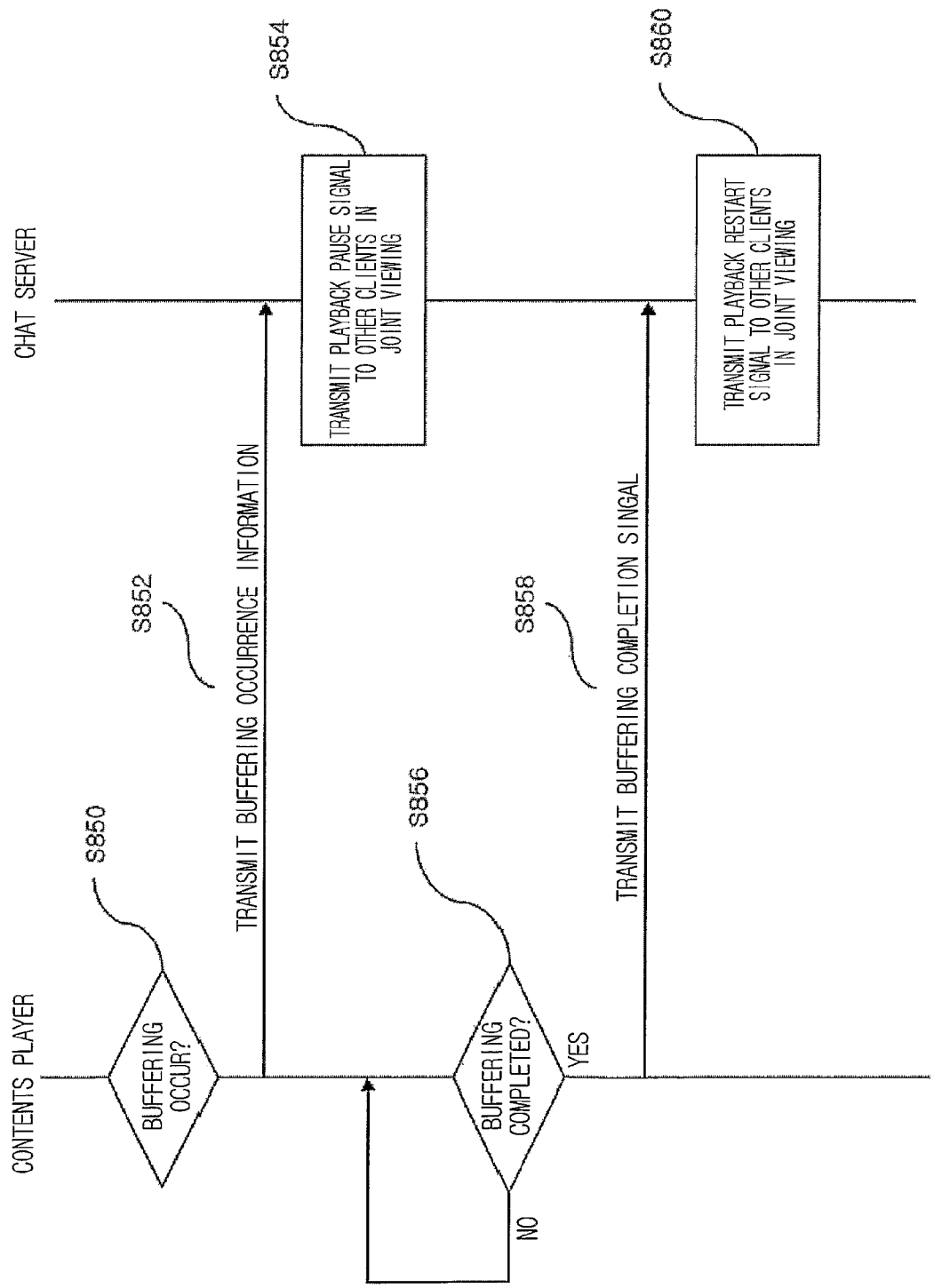
FIG. 11 is another flow chart synchronizing contents playing times when buffering occurs according to the first embodiment of the present invention.

FIG. 10 is another flow chart for synchronizing contents playing times when contents playing times of user clients are not same according to the first embodiment of the present invention, FIG. 11 is another flow chart synchronizing contents playing times when buffering occurs according to the first embodiment of the present invention.

FIG. 10 and FIG. 11 illustrate method for synchronizing by pausing contents playback of normal clients temporarily when playing time delay or buffering occurs in at least one client. Referring to FIG. 10, the contents player transmits current contents playing time to the chat server at predetermined time interval S800.

The chat server that received contents playing time information determines if the difference between the received contents playing time and the reference time is greater than predetermined critical value S802.

If the difference between the received contents playing time and the reference time is greater than predetermined critical value, the chat server sends playing pause signal to other clients S804. At this time, the chat server sets the playing pause time to be the value of delayed playing time.

After the time that playing pause signal is transmitted, if the playing pause time is reached, the playing restart signal is transmitted to the clients that received playing pause signal S806.

Referring to FIG. 11, the contents player determines if buffering occurs S850. As described above, it is preferable that the detection of buffering occurrence is checked without regard to time interval at which the contents playing time information is transmitted.

If buffering occurs on account of network condition, etc., the contents player transmits buffering occurrence information to the chat server S852.

When buffering occurrence information is received from at least one client among clients in joint watching, the chat server transmits playback pause signal to other clients in joint watching S854. The clients that received playback pause signal pauses playback until playback restart signal is received.

The contents player checks continuously if the buffering is completed S856, and sends buffering completion signal to the chat server when buffering is completed S858.

The chat server that received buffering completion signal transmits playback restart signal to the clients that received playback pause signal S860

The Second Embodiment

In the above described first embodiment, the chat server operates as a base element which performs synchronization. In the second embodiment to be described hereinafter, the synchronization is performed based on the contents playing time of a room master client in the joint watching room. Unlike the first embodiment, the chat server just relays chatting messages and does not participate in synchronization substantially.

In the second embodiment, the system configuration for joint viewing is same as the system shown in FIG. 1 of the first embodiment. The system for joint viewing according to the second embodiment comprises a web server 100, a chat server 102, a contents server 104, a billing server and a plurality of user clients, as is the system of the first embodiment.

In the second embodiment, the function of the web server 100 is same as the first embodiment. That is, the web server 100 provides web page by which the user can request joint viewing for moving pictures. Like FIG. 2, the web server is coupled to the state information database and provides created room information and state information of each room (title of moving picture, users that joined the room).

The chat server 102 relays chatting messages by users in the joint viewing room. In the second embodiment, users exchanges state information on contents playback at predetermined time interval and the chat server 102 also relays the state information on contents playback. As described above, in the second embodiment, the chat server just relays chatting message or state information and does not participate in synchronization.

Further, the chat server 102 manages state information of each joint viewing room. When state of room changes, for example, new user joins room, the chat server detects the state change. Like the web server, the chat server is coupled to the joint viewing user database and provides the information on state change to the joint watching user database.

Contents player that provides chatting message transmission/receipt function and contents playback function is installed in each of the user clients 108, 110, 112, 114 in joint viewing. Like the first embodiment, the contents player includes a window for chatting message display and a window for inputting chatting message. In the second embodiment, the contents player synchronizes contents playing times of users in joint viewing. For synchronization, the contents player comprises a synchronization module.

In the second embodiment, the contents player performs contents playing time synchronization, while in the first embodiment, the synchronization of contents playing time is substantially performed by the chat server.

In the second embodiment where contents player performs synchronization, the contents player of a room master client provides reference time information. That is, the contents player of the room master client provides information on current contents playing time of the room master client to other clients in joint viewing at predetermined time interval, the other clients in joint viewing synchronizes contents playing time of theirs with the contents playing time of the room master client.

According to a preferred embodiment of the present invention, other clients besides room master client also transmits information on current playing to the clients in joint viewing. That is, the client in joint viewing receives not only the current contents playing time information of the room master client but also the current contents playing time information of other clients in joint viewing. The state information of each client is transmitted to the other clients through the chat server.

The function of the contents server is same as that of the first embodiment. That is, the contents server provides contents in response to request of clients in joint watching. Like the first embodiment, there may be plurality of contents servers and the contents server need not be a server provided by a contents provider, contents can be provided from other clients in network through P2P method.

Like the first embodiment, the joint watching service in various ways. Joint viewing service by chatting room, joint viewing service using concept of p off-line theater, joint viewing service using concept of joint buying etc. can also be applied to the second embodiment.

Figure 14:
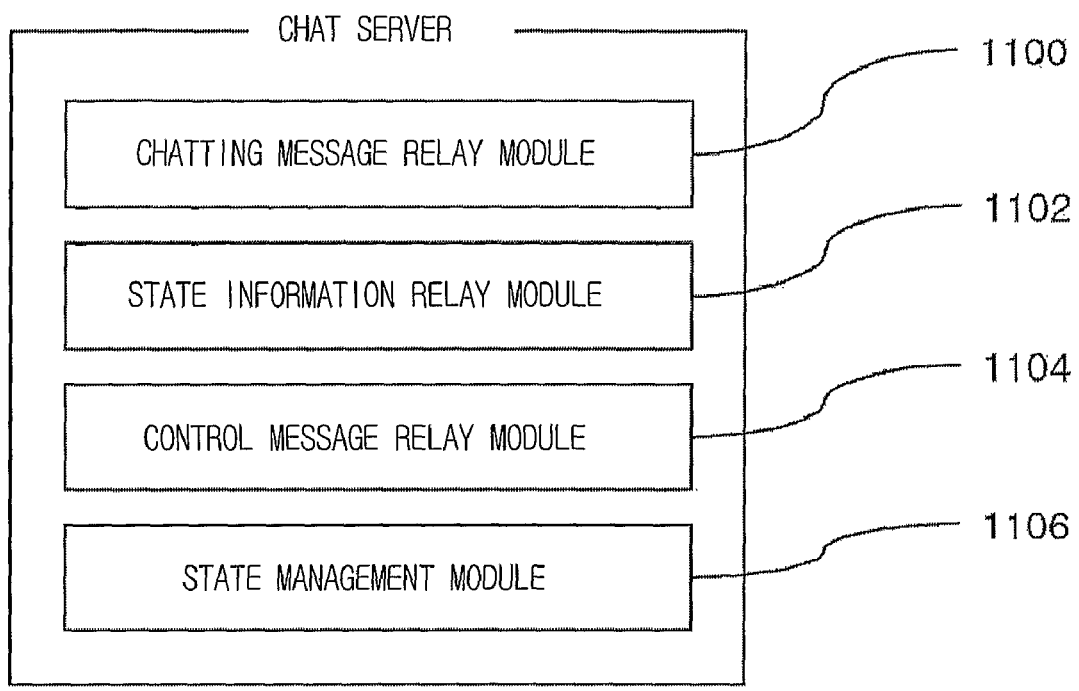
FIG. 14 illustrates a module configuration of the chat server according to the second embodiment of the present invention.

FIG. 14 illustrates a module configuration of the chat server according to the second embodiment of the present invention.

As shown in FIG. 14, the chat server of the second embodiment comprises a chatting message relay module 1100, state information relay module 1102, a control message relay module 1104 and a state management module 1106.

In FIG. 14, the chatting message relay module 1100 relays chatting message of users in joint viewing. Generally, when a user inputs a chatting message to send to the chat server, the chat server sends the chatting message to all users in joint viewing room. When user selects a particular user in requesting to send chatting message, the chat server sends the received message to the corresponding user. The chat server manages IP addresses of all users in joint watching room, and relays the chatting messages using the IP addresses.

The state information relay module 1104 relays state information on contents replay of a user in joint viewing to other users in joint viewing. According to the second embodiment, the contents player in the user client sends state information on contents replay to the chat server at predetermined time interval and the chat server relays the received information to the other clients.

Current contents playing time information, buffering information, network condition information (contents download rate), etc, can be included in the state information. According to a preferred embodiment of the present invention, the state information may comprise letter string like chatting message, and comma can be used for classification of information in the letter string. The identification information of the state information message is different from the identification information of the chatting message, and the chat server determines type of the message through the identification information.

The control message relay module 1104 relays control message regarding the contents playback from the room master client to other clients. The control message regarding the contents playback may comprise a playback start message, playback pause message, playback location control message, etc. As described above, in the second embodiment, the synchronization is performed based on the room master client, it is preferable that the playback start, playback pause, playback location control is performed by the room master client. However, the control message sender can be changed by operator, it would be obvious to those skilled in the art that other clients besides the room master client can send the control messages.

The state management module 1106 mages state of joint watching room. The state information may include title of the room, the number of joining users, contents information being watched, user ID information, user address information, etc. When a user joins the joint watching room or exits the joint watching room, the chat server detects it and provides detected information to the joint watching user database.

Figure 15:
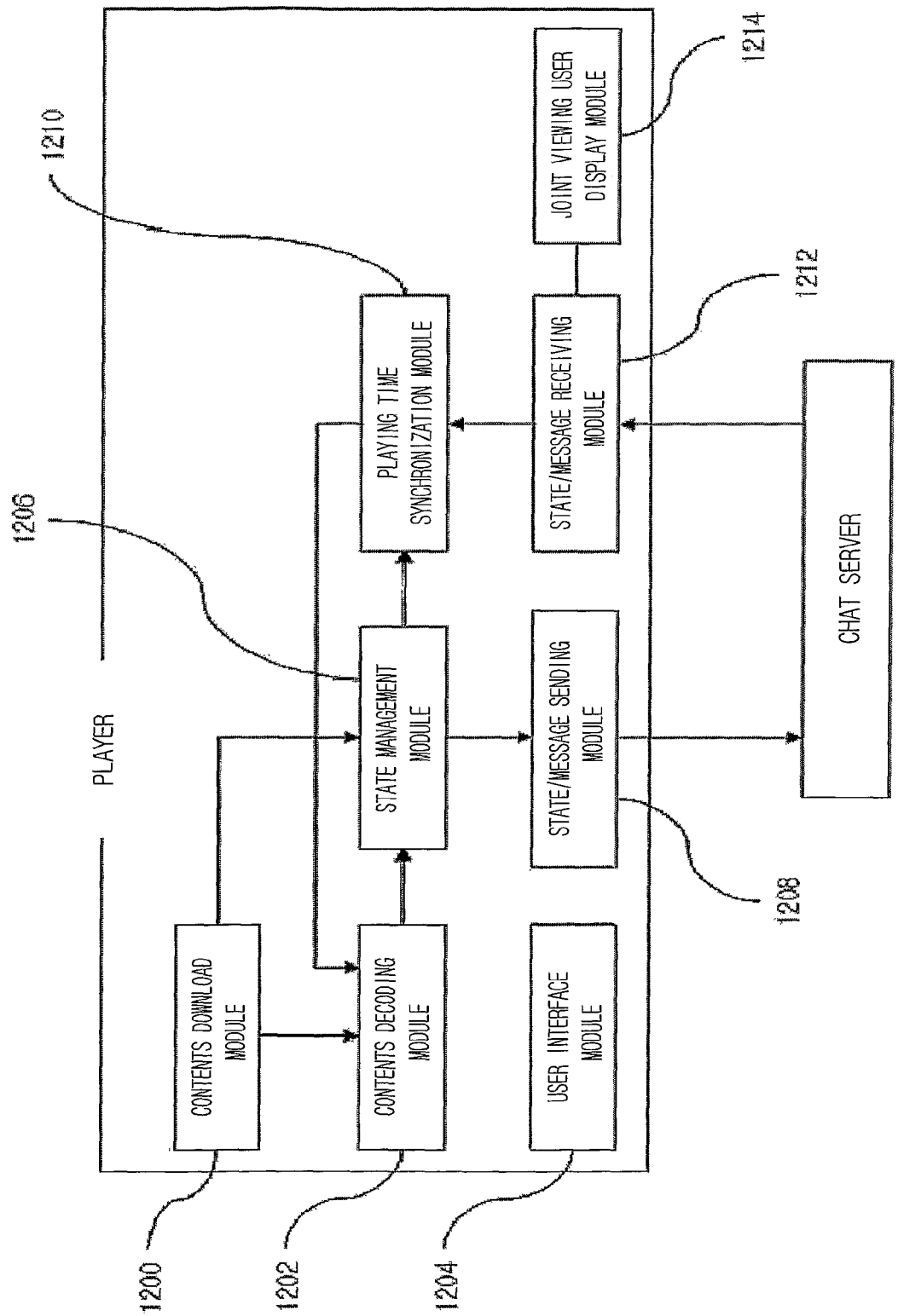
FIG. 15 illustrates a module configuration of the contents player according to the second embodiment.

FIG. 15 illustrates a module configuration of the contents player according to the second embodiment.

Referring to FIG. 15, the contents player of the second embodiment comprises a contents download module 1200, a contents decoding module 1202, a user interface module 1204, a state management module 1206, a state/message sending module 1208, a playing time synchronizing module 1210, state/message receiving module 1212 and joint watching user display module 1214.

In FIG. 15, the contents download module 1200 download moving picture contents to be watched. The user clients in joint viewing may download the contents from a same server, or may down load the contents from different servers when plurality of servers are used. As described in the first embodiment, the contents download may be performed by the P2P method, at this case, the contents player of each user in joint watching downloads contents from different nodes independently. Additionally, the contents download module may provide network state information based on the contents download rate to the state management module 1206.

The contents decoding module 1202 decodes contents data received through the contents download module 1200. Information on contents encoding method is included in the meta information of the contents, and the contents decoding module decodes contents data by the decoding method corresponding to the encoding method. The contents decoding module 1202 provides information on current contents playing time to the state management module 1206.

The user interface module 1204 processes commands from user through interface of the contents player. The contents player includes various interfaces such as playback, pause, playback time shifting, and volume control, the user interface module controls so that commands through the interfaces are performed. According to the preferred embodiment of the present invention, interface such as playback pause, playback time shifting are activated only on the contents player of the room master client and are not activated on the contents player of the other clients.

The state management module 1206 manages state information on the contents playback. The information managed by the state management module 1206 may include current contents playing time information, buffering information and network condition information, etc. The current contents playing time information is provided from the contents decoding module 1202, as described above, it is preferable that the current contents playing time information is transmitted to all other clients in joint viewing. However, it would be obvious to those skilled in the art that only the current contents playing time of the room master client can be transmitted to other clients in joint viewing, because current contents playing time of the room master client is set to be the reference time.

The state management module 1206 also manages buffering information. The buffering information is used when contents playback is firstly started and all clients in joint viewing need to restart playback at the same on account of contents playing time moving for synchronization.

The state management module 1206 also manages state information of other clients that is provided through the state/message receiving module 1212.

The state/message sending 1208 module provides chatting message or state message to the chat server. Further, in case of the contents player of the room master client, control message (pause, playing time shifting) is sent to other clients through the state/message sending module 1208.

The state/message sending module determines type of message (chatting message, state information message, control message) and attaches corresponding identifier to the message to send to the chat server.

The chatting message or the control message is sent through the state/message sending module when particular event occurs, which includes control command by room master client and request for sending chatting message by a user. However, the state information message can be sent to the chat server at the predetermined time interval.

The playing time synchronization module 1210 synchronizes contents playing time of the moving picture contents with the reference time. As described above, the reference time is current contents playing time of the room master client, the room master client transmits information on current contents playing time to the other clients in joint viewing at the predetermined time interval.

The playing time synchronization module 1210 operates when the current contents playing time does not match the reference time, if the difference between the current playing and the reference time is not great, the playing time synchronization module synchronizes current playing with the reference time by playing contents at faster or slower rate. If the difference between the current playing and the reference time is great, the playing time synchronization module 1210 synchronizes contents playing time by shifting contents playing time of the contents to match the reference time.

In case of the room master client, because the contents playing time is the reference time, the playing time synchronization module does not operate except special cases. More detailed operation configuration of the synchronization module is described below referring to another figure.

The state/message receiving module 122 receives chatting message, state information message, control message from other clients through the chat server to process them. The state/message receiving module 1212 determines type of message through the identifier of the message.

If the received message is the chatting message, the state/message receiving module 1212 displays the received message on the chatting window.

If the received message is the state information message, the state/message receiving module provides the state information to the state management module 1206 and the joint viewing user display module 1214. If the received state information is the reference playing time information, the reference playing time information is provided to the state management module 1206, and the state management module 1206 controls the synchronization module to perform the synchronization when the current contents playing time does not match the reference time. Further, in order for user to see other user's states, the state information is displayed through the joint viewing user display module 1214. Users can see other users' contents playing time, occurrence of buffering, network condition information through the joint viewing user display module 1214.

If the received message is the control message, the received message is provided to the user interface module 1204, and the user interface module 1204 processes the message.

Figure 16:
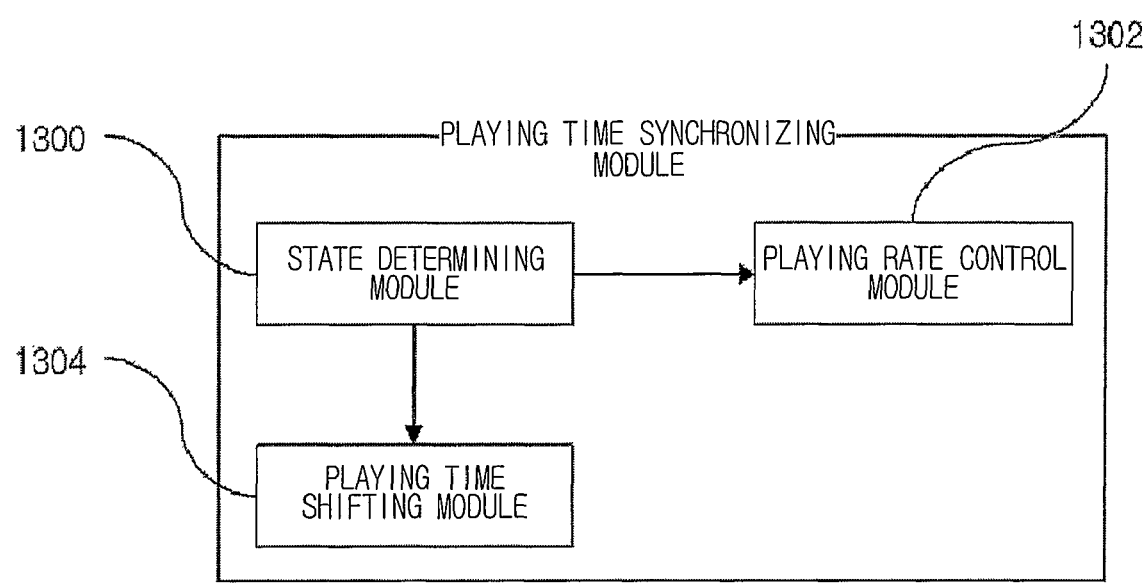
FIG. 16 illustrates module configuration of the synchronization module according to the second embodiment of the present invention.

FIG. 16 illustrates module configuration of the synchronization module according to the second embodiment of the present invention.

Referring to FIG. 16, the synchronization module may comprise a state determining module 1300, playing rate control module 1302, playing time shifting module 1304.

In FIG. 16, the state determining module 1300 determines if the synchronization is performed through the playing rate control or the playing time shifting.

If the difference between the current contents playing time and the reference time is not greater than the predetermined critical value, the state information determines that the synchronization is performed through the playing rate control. According to an embodiment of the present invention, if the difference between the current contents playing time and the reference time is smaller than 3 seconds, the synchronization is performed through playing rate control. If the difference between the current contents playing time and the reference time is greater than 3 seconds, the synchronization is performed through contents playing time shifting.

When the difference between the current contents playing time and the reference time is not greater than the predetermined critical value, the playing rate control module 1302 plays the moving picture at faster or slower rate. The rate may be calculated by a predetermined calculation depending on the difference between the current contents playing time and the reference time. In controlling playing rate, the controlled rate is preferred to be 0.1%~1.1% of normal playing rate so that users do not recognize change of playing rate.

According to an embodiment of the present invention, the playing rate control program source of Direct Show can be used for controlling of playing rate.

According to another embodiment of the present invention, the playing rate can be controlled by controlling frequency of audio signal. Generally, as the video signal is synchronized with the audio signal, if the frequency of the audio signal changes, the output rate of the video signal also changes according to the audio signal. Besides above cases, other various ways to control playing rate can be used, and it would be obvious to those skilled in the art that the variation of playing rate control way would not affect the spirit and scope of the present invention.

When the difference between the current contents playing time and the reference time is not greater than the predetermined critical value, the playing time shifting module 1304 shifts playback time based on the reference time. On shifting playback time, the playing time shifting module 1304 searches nearest key frame among key frames after the reference time, and controls the contents playing time so that contents playback is restarted from the playback time corresponding to the searched key frame. Generally, key frame information is included in the header information of the moving picture file.

Figure 17:
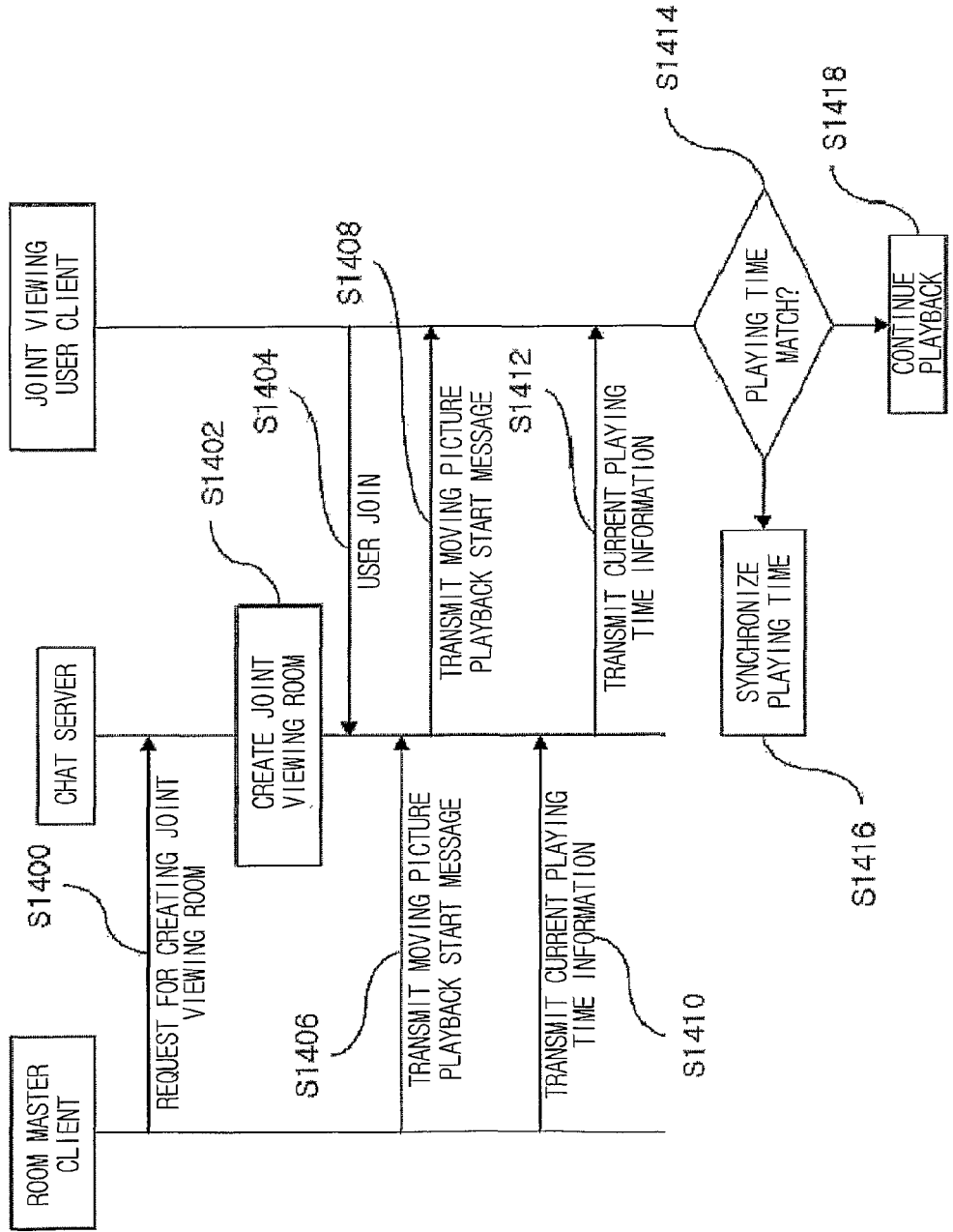
FIG. 17 illustrates a flow chart of method for providing service for joint viewing of moving picture according to the second embodiment of the present invention.

FIG. 17 illustrates a flow chart of method for providing service for joint viewing of moving picture according to the second embodiment of the present invention.

Referring to FIG. 17, the room master client requests the chat server to create joint viewing room S1400. The room master may request for creating joint viewing room to the chat server through the web page that web server provides. Like general chatting rooms, the room master may create open room or may create closed room where only authorized users can join.

In response to the request for creating joint viewing room, the chat server creates joint viewing room and provides the creation information to the joint viewing user database S1402. As the web server interacts with the joint viewing user database, users who connected to the web server can see created room information through the web page.

Among users who can see created room information, certain user requests the chat server to join the room through the web page S1404.

When all users enter the joint viewing room, room master sends contents playback start message to the chat server S1406, the chat server sends playback start message to other clients joined the joint viewing room S1408. Through the playing start message that the room master client sends, the all clients in joint viewing room starts contents playback simultaneously.

As described above, the clients in joint viewing room sends state information on playback to other clients at predetermined time interval, the room master client also sends contents playing time information to other client in joint viewing. The contents playing time information of the room master client is sent to the chat server S1410, the chat server sends the received contents playing time information from the room master client to all clients in joint viewing S1412.

Clients in joint viewing that received contents playing time information of the room master clients determines if the current contents playing time matches the contents playing time of room master client S1414.

If the contents playing time matches, the contents playing is continued S1418, if the contents playing time does not match, predetermined synchronization process is performed S1416.

Figure 18:
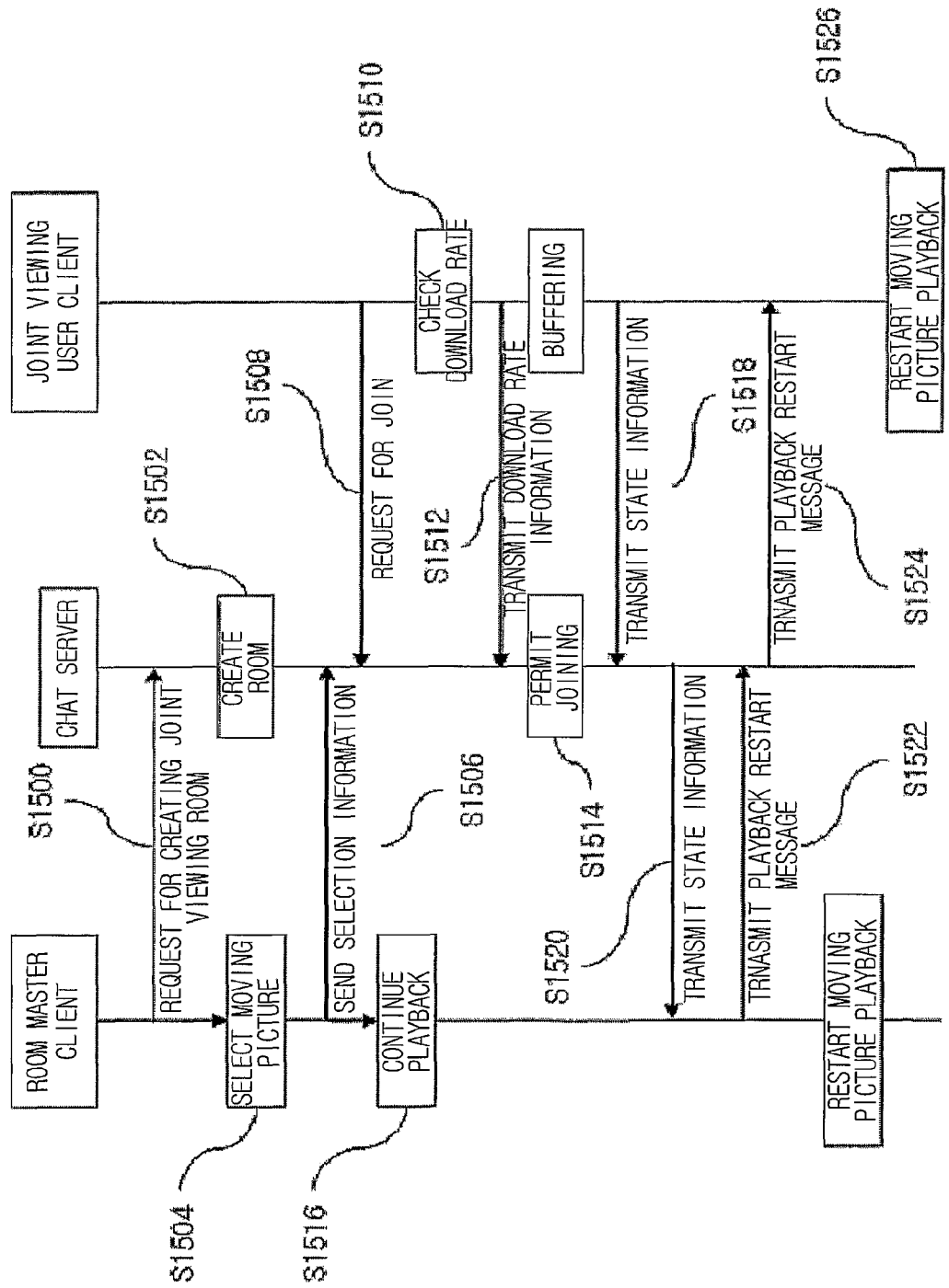
FIG. 18 illustrates a detailed flow chart from the process to create joint viewing room to start contents playback according to the second embodiment of the present invention.

FIG. 18 illustrates a detailed flow chart from the process to create joint viewing room to start contents playback according to the second embodiment of the present invention.

Referring to FIG. 18, the room master client requests the chat server to create joint viewing room through the web page S1500.

The chat server creates room in response to the room creation request and provides the creation information to the joint viewing user database S1502.

The room master that created joint viewing room selects moving picture contents S1504. Although the case that moving picture contents is selected after creating room, moving picture contents can be selected while creating room. Selected moving picture contents information is transmitted to the chat server.

When moving picture is selected, the contents player of the room master client starts buffering for the selected moving picture by requesting moving pictures to contents server S1506.

As the web server interacts with the joint viewing user database, the created room information and the moving picture selection information is displayed in the web page, other users can the joint viewing room through the web page S1508.

If there is request for joining the created joint viewing room, the contents player of user that requested to join starts download rate checking S1510. If download rate of one user is low, it would affect the joint viewing of other users. Therefore it is preferable that only the user with higher download rate than the predetermined value is permitted to join the joint viewing room.

According to the preferred embodiment of the present invention, the download rate is preferred to be checked for the data corresponding to the selected moving picture contents. That is, the download rate check is performed in the way that selected contents data is requested to the contents server and download rate is checked for the receiving contents data. When the download rate check data is moving picture data to be joint watched, it is advantageous in that the buffering can be performed along with the download check.

If the download rate is higher than the predetermined value, the chat server permits joining the joint viewing room S1514. The information indicating that other user joined the room is stored in the state information database through the chat server.

The user client that joined the joint viewing room continues contents buffering S1516.

Further, the clients in the joint viewing room transmits state information to the chat server periodically S1518. As described above, the state information includes buffering information, contents playing time information and network condition information, and before the contents playing, buffering information may be transmitted to the other clients.

The chat server transmits the received state information to the other clients in the joint viewing room S1520.

The room master client checks buffering state of other clients. If the buffering size is more than the predetermined size, the room master client sends playing start message to the chat server S1522, the chat server sends the received playing start message to the other clients in the joint viewing room S1524.

By the playing start message of the room master client, the all clients in the joint viewing room starts contents playback simultaneously S1526.

Figure 19:
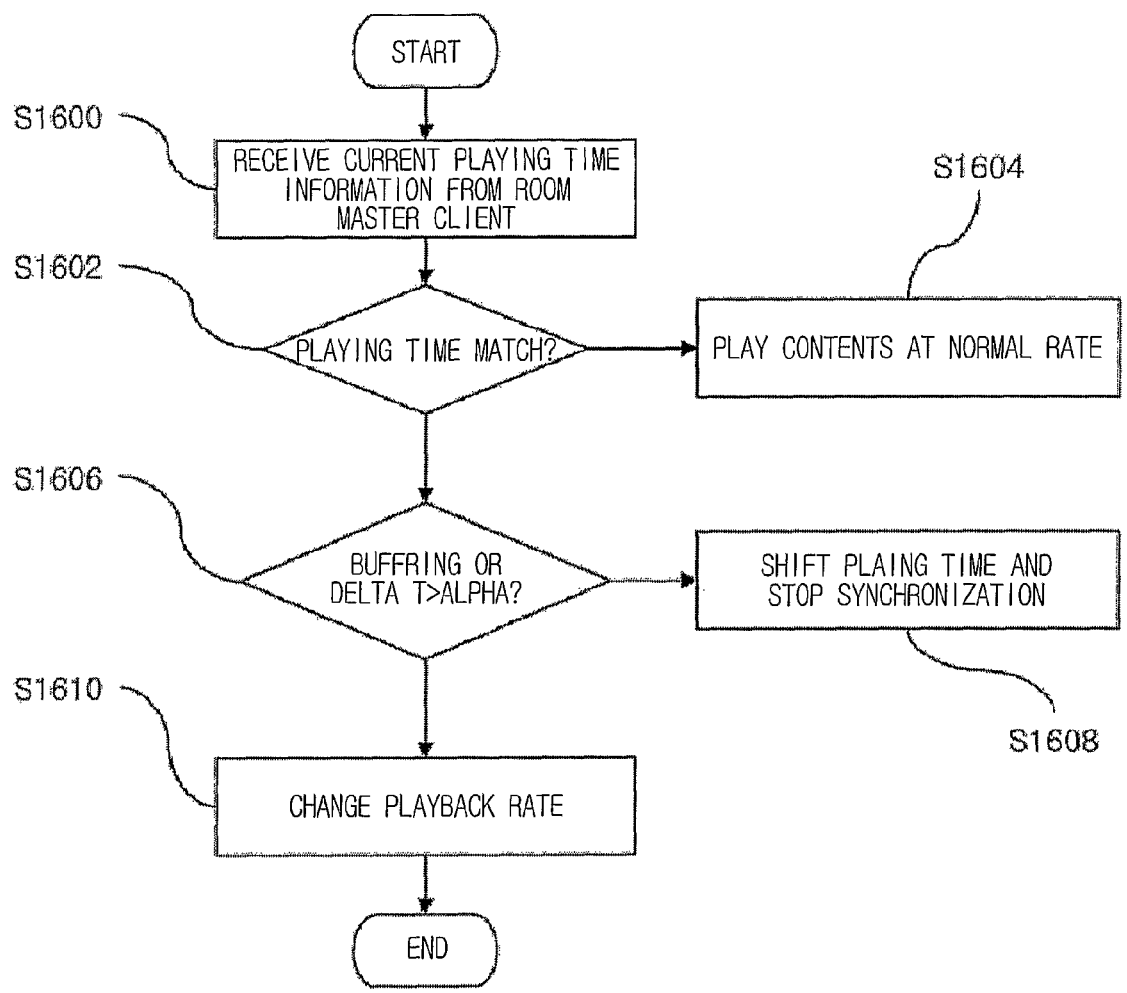
FIG. 19 is a flow chart for synchronizing contents playing times performed by the playing time synchronization module according to the second embodiment of the present invention.

FIG. 19 is a flow chart for synchronizing contents playing times performed by the playing time synchronization module according to the second embodiment of the present invention.

Referring to FIG. 19, the clients in joint viewing room receives playing time information of other clients periodically including contents playing time of room master client used as the reference time S1600.

The contents player determines if the contents playing time matches the reference time S1602, and plays the contents at normal rate when the contents playing time matches the reference time S1604.

If the contents playing time does not match the reference time, contents player determines if the difference between the contents playing time and the reference time is greater than the predetermined time difference. The contents player further determines if buffering has occurred S1606.

If buffering has occurred or the difference between the contents playing time and the reference time is greater than the predetermined time difference, the contents player shifts contents playing time based on the reference time S1608. As described above, the contents player shifts contents playing time to playing time nearest key frame among key frames after the reference time. However, if buffering continues seriously, the synchronization process can be stopped. At this case, the corresponding contents player plays contents regardless of contents playing times of other clients in the joint viewing room.

If the difference between the contents playing time and the reference time is not greater than the predetermined time difference, the contents player performs play rate control for synchronization S1610.

Figure 20:
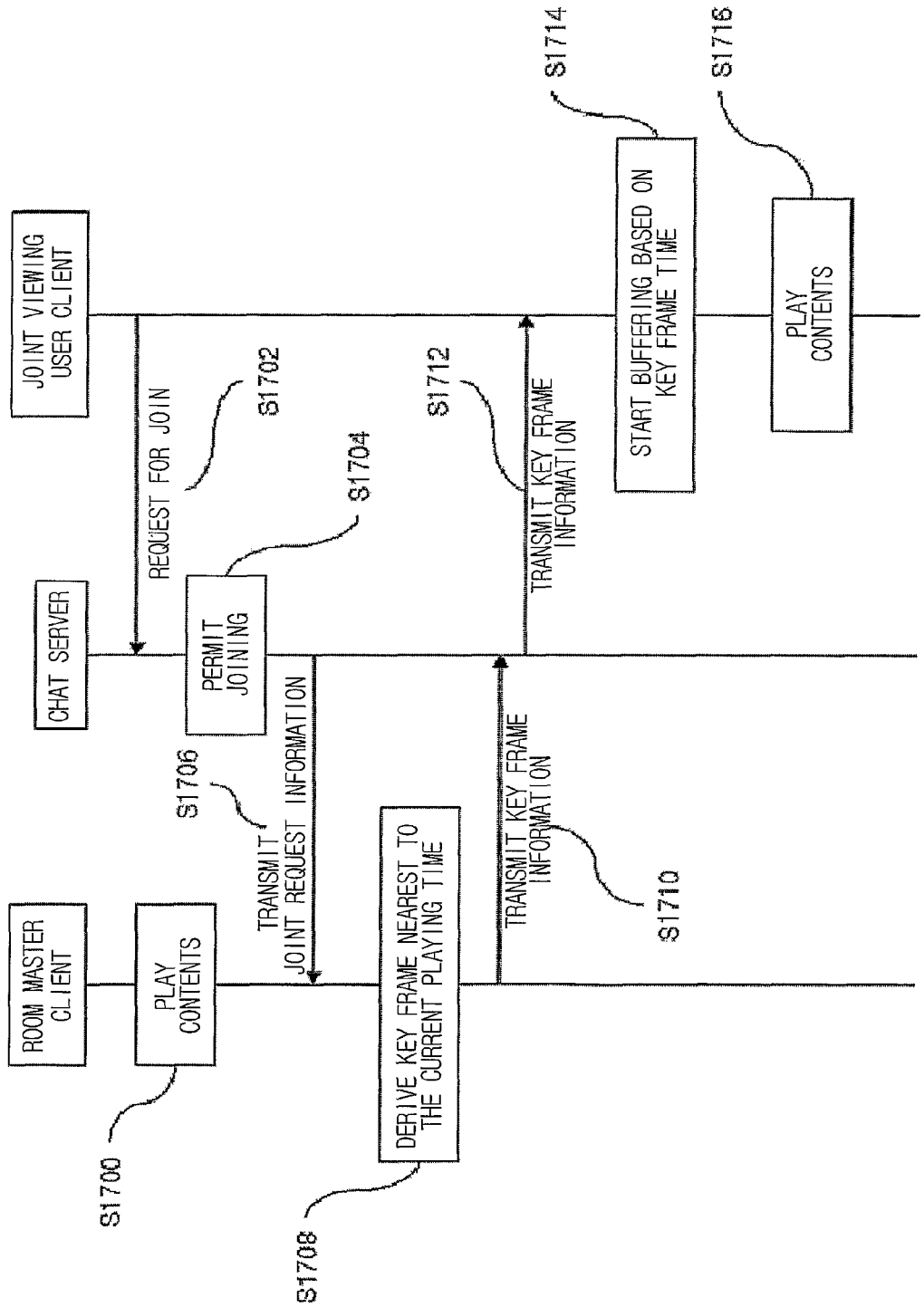
FIG. 20 illustrates a flow chart for process when new user joins while joint viewing according to the second embodiment of the present invention.

FIG. 20 illustrates a flow chart for process when new user joins while joint viewing according to the second embodiment of the present invention.

Referring to FIG. 20, the room master client and the other clients are in the state of playing contents S1700.

While playing contents, if new user requests the chat server to join S1702, the chat server checks download rate, etc. and permits the joining of the user.

The chat server transmits information indicating that new user joined the room to room master client and the other clients S1706.

The room master client that received the information indicating that new user joined the room derives nearest key frame information following the current playing time and transmits the key frame information to the chat server S1710. The chat server transmits the received key frame information to the new user S1712. The key frame information is transmitted to only the new user.

The client that received key frame information starts buffering based on the contents playing time corresponding to the key frame S1714, and plays contents after buffering is completed S1716. After contents playback, the process that comparing the playing with the reference time is performed periodically and synchronization may be performed depending on the comparison result.

Figure 21:
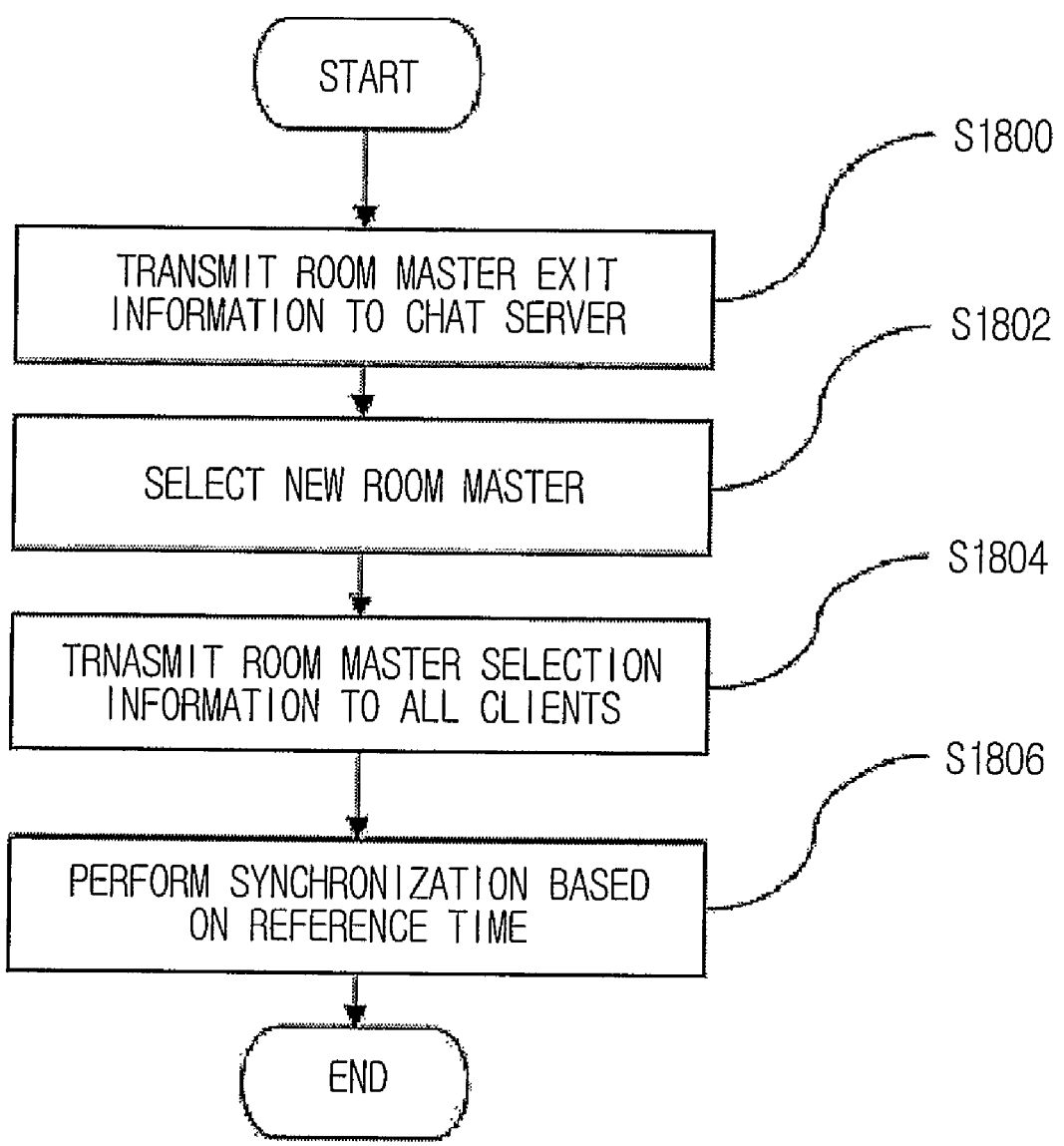
FIG. 21 illustrates a flow chart of room master succession process when the room master exits the joint viewing room according to the second embodiment of the present invention.

FIG. 21 illustrates a flow chart of room master succession process when the room master exits the joint viewing room according to the second embodiment of the present invention.

Referring to FIG. 21, When the room master exits the joint viewing room of his own will or on account of network instability, room master exit information is transmitted to the chat server S1800.

The chat server selects one user as the room master among users in joint viewing room S1802. According to an embodiment of the present invention, a user who joined the room firstly may be selected as the room master, alternatively, the room master may be selected based on the network condition information or contents playing time information.

If the new room master is determined, the chat server transmits room master selection information to all clients in the joint viewing room S1804. Playback pause button and playing time change button of contents player of the user who was selected as the room master is activated.

Synchronization process based on the new reference is performed when the new room master is determined S1806.

Since the accompanying drawings and the detailed description are only examples of the present invention, it is only for describing the present invention not for limiting the scope of the present invention. Therefore, those who skilled in the art will understand that many changes and equivalent embodiments can be made without departing from the present invention. Thus, the true scope of the present invention must be determined by the accompanying claims.

INDUSTRIAL APPLICABILITY

As described above, according to the service for joint viewing of moving picture of the first embodiment and the second embodiment, users can exchange their opinions through chatting message while watching moving picture contents, and therefore users can get enjoyment by watching moving picture contents with others through VOD service.

Further, according to the service for joint viewing of moving picture of the first embodiment and the second embodiment, as the contents playing time of users in joint viewing is synchronized by monitoring current contents playing time of each user client and occurrence of buffering, the sense of reality for watching moving picture together with others can be promoted.

The invention claimed is:

1. A method for providing joint viewing of contents comprising the steps of:
   (a) creating a joint viewing room in response to request for creating joint viewing room from a user, wherein the joint viewing room allows a plurality of users to watch the same moving pictures during substantially same time period;
   (b) allowing at least one other user to join said joint viewing room;
   (c) providing contents data to the users that joined the joint viewing room;
   (d) facilitating at least one chat session through which at least some of said users joined in the joint viewing room chat with each other with electronic messages;
   (e) transmitting current contents playing time information to at least some of the other users joined in the joint viewing room in response to request from a room master client; and
   (f) allowing said at least some of the other users to synchronize the contents playing time based on the contents playing time of the room master client.

2. The method of claim 1, wherein the users in the joint viewing room can transmit information regarding the playback state to the other users periodically.

3. The method of claim 2, wherein the information regarding the playback state is any one or combination selected from the group consisting of current contents playing time information, buffering information, and network condition information.

4. The method of claim 1, wherein a contents player of each of the users in the joint viewing room performs the following steps:

determining if current contents playing time matches the contents playing time of the room master client;

determining if difference between the current contents playing time and the contents playing time of the room master client is greater than a predetermined critical value, when the current contents playing time does not match the contents playing time of the room master client;

controlling playing rate at faster rate or slower rate when the difference between the current contents playing time and the contents playing time of the room master client is not greater than the predetermined critical value, shifting the contents playing time based on the contents playing time of the room master client when the difference between the contents current playing time and the contents playing time of the room master client is greater than the predetermined critical value.

5. The method of claim 4, wherein the playing rate control is performed using a playing rate control program source or adjusting frequency of an audio signal.

6. The method of claim 4, the contents playing time is shifted to the playing time corresponding to the nearest key frame with the contents playing time of the room master client among key frames after the contents playing time of the room master client.

7. The method of claim 1, further comprising the steps of:
transmitting information indicating that a new user joined the joint viewing room to the existing users in the joint viewing room in response to request of the new user for joining the joint viewing room while the contents being played;

receiving key frame information needed for playing time synchronization from the room master client to transmit the key frame information to the new user that joined the joint viewing room, wherein the client of the new user starts buffering based on the contents playing time corresponding to the received key frame.

8. A system for providing service for joint viewing of contents comprising:
a web server for receiving request for joint viewing from users to process it;
a contents server for storing moving picture contents and for providing the stored moving picture contents to users that requested joint viewing;
a chat server for relaying chatting message while joint viewing, state information regarding contents playback, control message regarding contents playback provided from a room master client to other users in joint viewing; and
a joint viewing user database coupled to the web server and the chat server for managing state information of joint viewing room;
wherein a contents player for playing contents and providing chatting related interface is installed in the user clients in joint viewing room, the room master client transmits current contents playing time information to other user clients in the joint viewing room periodically, and the other user clients in the joint viewing room synchronize contents playing time based on the contents playing time of the room master client.

9. The system of claim 8, wherein the information regarding the playback state is any one or combination selected from the group consisting of current contents playing time information, buffering information and network condition information.

10. The system of claim 8, wherein the contents player of the user clients in joint viewing performs the steps of comprising: determining if current contents playing time matches the contents playing time of the room master client;

determining if difference between the current contents playing time and the contents playing time of the room master client is greater than a predetermined critical value, when the current contents playing time does not match the contents playing time of the room master client;

controlling playing rate at faster rate or slower rate when the difference between the contents playing time and the contents playing time of the room master client is not greater than the predetermined critical value; and shifting the contents playing time based on the contents playing time of the room master client when the difference between the current contents playing time and the contents playing time of the room master client is greater than the predetermined critical value.

11. A method for providing joint viewing of contents comprising the steps of:
(a) creating a joint viewing room in response to request for creating a joint viewing room from a user;
(b) receiving request for joining the joint viewing room from at least one other user;
(c) receiving contents selection information from at least one user in the joint viewing room and transmitting the selected contents data to at least some of the users joined in the joint viewing room;
(d) transmitting playback start signal to said at least some of the users joined in the joint viewing room;
(e) synchronizing contents playing time of said at least some of the users joined in the joint viewing room; and
(f) allowing the users to chat with each other with electronic messages while contents being played.

12. The method of claim 11, further comprising the step of receiving playback ready signal from all user clients in the joint viewing room, wherein the step (d) is performed after playback ready signal is transmitted from all user clients in the joint viewing room.

13. The method of claim 12, wherein the users joined in the joint viewing room transmit the playback ready signal when more than predetermined size of contents data is buffered.

14. A method for providing joint viewing of moving picture to a plurality of users through an on-line theater web page at predetermined time, comprising the steps of:
(a) receiving request for joining an on-line theater from users;
(b) connecting users who satisfy predetermined conditions among the users who requested for joining the on-line theater to the on-line theater;
(c) determining if the predetermined time is reached;
(d) transmitting playback start message to all the users that joined the on-line theater; and
(e) synchronizing contents playing time of all the users that joined the on-line theater by monitoring current contents playing time information and occurrence of buffering of all user clients that joined the on-line theater.

15. The method of claim 14, the on-line theater provides service for joint viewing of predetermined moving picture contents at the predetermined time.

16. The method of claim 14, further comprising the step of allowing the users to chat with each other with electronic messages while moving picture being played or before moving picture being played.

17. The method of claim 14, wherein the step (e) for synchronizing contents playing time of all user clients that joined the on-line theater comprises the steps of: receiving current contents playing time information from all said users user at predetermined time interval;

receiving buffering occurrence information when buffering occurs in at least one user among said users that joined the on-line theater;

transmitting reference time information to the corresponding user when difference between the received current contents playing time and the reference time is greater than a predetermined critical value or buffering occurrence information is received; and receiving calculated moving picture skip time information from the corresponding user client.

18. The method of claim 17 wherein the step (e) for synchronizing contents playing time of all user clients that joined the on-line theater further comprises the step of transmitting playback restart message to the corresponding user when the skip time passes.

19. The method of claim 17, wherein the skip time is calculated using information on the difference between the contents playing time and the reference time and contents download rate of the corresponding user.

20. The method of claim 14, wherein the step (e) for synchronizing contents playing time of all the users that joined the on-line theater comprises the steps of:

receiving current contents playing time information from all the users at predetermined time interval;

determining if difference between received the contents playing time and reference time is greater than a predetermined critical value;

transmitting playback pause signal to the other users besides the corresponding user when the difference between received the contents playing time and the reference time is greater than the predetermined critical value; and transmitting playback restart signal to the other users besides the corresponding user when time corresponding to time difference between received the contents playing time and the reference time passes.

21. The method of claim 14, wherein the step (e) for synchronizing contents playing time of all the users that joined the on-line theater comprises the steps of:

transmitting playback pause signal to the users besides the user where buffering occurred, when buffering occurrence information is received from at least one user that joined the on-line theater; and transmitting playback restart signal to the users that received the playback pause signal when buffering completion information is received from the corresponding user.

22. A system for providing service for joint viewing of moving picture comprising:

a web server for providing a web page through which users can request for joint viewing of moving picture, the web server receiving request for joint viewing from users to process it;

a contents server for storing moving picture contents, the content server providing moving picture contents to users that requested joint viewing; and a chat server for receiving information on users that requested joint viewing through the web server or a database coupled to the web server, the chat server transmitting playback start message to the user clients that requested joint viewing so that the moving picture contents is played simultaneously, the chat server controlling the chatting message transmission/receipt, and the chat server receiving current contents playing time information and buffering occurrence information from the user clients in joint viewing to synchronize the contents playing time of the user clients in joint viewing.

23. The system of claim 22, wherein the chat server synchronizes contents playing time of the user client in joint viewing by skipping moving picture playback based on calculated skip time when contents playing time of at least one user client is delayed or buffering occurs.

24. The system of claim 22, wherein the chat server synchronizes contents playing time of the user client in joint viewing by transmitting playback pause signal to the user clients besides at least one user client where contents playing time is delayed or buffering occurs for the delayed time interval or until the buffering is completed.

25. A method for providing joint viewing of moving picture, comprising the steps of:

(a) receiving request for joint viewing of moving picture from users;

(b) providing requested moving picture contents to the users that requested joint viewing of moving picture;

(c) receiving a moving picture playback ready signal from the users that requested joint viewing of moving picture;

(d) transmitting playback start message to all user clients that requested joint viewing of moving picture when moving picture playback ready message is received from all users; and (f) synchronizing contents playing time of all user clients in joint viewing by monitoring contents playing time information and occurrence of buffering of user clients in joint viewing.

26. The method of claim 1, wherein the current contents playing time information is transmitted to at least some of the other users joined in the joint viewing room periodically.

27. The method of claim 1, further comprising the steps of:

providing buffering state information of the users in the joint viewing room to said room master client; and transmitting contents playback start message received from said room master client to said at least some of the other users in the joint viewing room.

28. The method of claim 27, wherein the playback start message is transmitted when the all clients in the joint viewing room complete buffering for selected contents.

29. The method of claim 14, further comprising the step of:

determining if more than predetermined number of users join the created on-line theater room.

30. The method of claim 11, wherein the step (e) for synchronizing contents playing time of all user clients that joined the on-line theater comprises the steps of: receiving current contents playing time information from all said users at predetermined time interval;

receiving buffering occurrence information when buffering occurs in at least one user among said users that joined the on-line theater;

transmitting reference time information to the corresponding user when difference between the received current contents playing time and the reference time is greater than a predetermined critical value or buffering occurrence information is received; and receiving calculated moving picture skip time information from the corresponding user.

31. The method of claim 11, wherein the step (e) for synchronizing contents playing time of all the users that joined the on-line theater comprises the steps of:

receiving current contents playing time information from all the users at predetermined time interval;

determining if difference between received the contents playing time and reference time is greater than a predetermined critical value;

transmitting playback pause signal to the other users besides the corresponding user when the difference between received the contents playing time and the reference time is greater than the predetermined critical value; and transmitting playback restart signal to the other users besides the corresponding user when time corresponding to time difference between received the contents playing time and the reference time passes.

32. The method of claim 11, wherein the step (e) for synchronizing contents playing time of all the users that joined the on-line theater comprises the steps of:

transmitting playback pause signal to the users besides the user where buffering occurred, when buffering occurrence information is received from at least one user that joined the on-line theater; and transmitting playback restart signal to the users that received the playback pause signal when buffering completion information is received from the corresponding user.

* * * * *